(12) United States Patent
Shoraku et al.

(10) Patent No.: US 8,319,926 B2
(45) Date of Patent: Nov. 27, 2012

(54) LIQUID CRYSTAL DISPLAY DEVICE

(75) Inventors: Akihiro Shoraku, Osaka (JP);
Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 197 days.

(21) Appl. No.: 12/517,626

(22) PCT Filed: Dec. 3, 2007

(86) PCT No.: PCT/JP2007/073342
§ 371 (c)(1),
(2), (4) Date: Jun. 4, 2009

(87) PCT Pub. No.: WO2008/069181
PCT Pub. Date: Jun. 12, 2008

(65) Prior Publication Data
US 2009/0279034 A1      Nov. 12, 2009

(30) Foreign Application Priority Data

Dec. 5, 2006   (JP) ................................ 2006-328600

(51) Int. Cl.
*G02F 1/1337*      (2006.01)
(52) U.S. Cl. ........ 349/129; 349/130; 349/139; 349/144; 349/143; 349/39
(58) Field of Classification Search .................. 349/129, 349/130, 139, 144, 143, 39
See application file for complete search history.

(56) References Cited

U.S. PATENT DOCUMENTS

| | | |
|---|---|---|
| 5,748,276 A | 5/1998 | Uno et al. |
| 6,067,140 A | 5/2000 | Woo et al. |
| 6,249,011 B1 | 6/2001 | Matsumoto |
| 6,335,776 B1 | 1/2002 | Kim et al. |
| 6,369,870 B1 | 4/2002 | Koma |

(Continued)

FOREIGN PATENT DOCUMENTS

JP         08-160454         6/1996

(Continued)

OTHER PUBLICATIONS

U.S. Office Action mailed Apr. 23, 2010 in corresponding U.S. Appl. No. 12/295,672.

(Continued)

*Primary Examiner* — Edward Glick
*Assistant Examiner* — Sang Nguyen
(74) *Attorney, Agent, or Firm* — Nixon & Vanderhye P.C.

(57) ABSTRACT

In the liquid crystal display device of the present invention, each pixel region includes first, second and third subpixel electrodes 111*a*, 111*b*1 and 111*b*2, a vertical alignment liquid crystal layer, a counter electrode 121, and an alignment film. The second and third subpixel electrodes are arranged to interpose the first subpixel electrode. Each pixel region is comprised of first, second and third regions associated with the first, second and third subpixel electrodes, respectively. Each pixel region includes eight liquid crystal domains in total, consisting of two sets of four liquid crystal domains A, B, C and D of first, second, third and fourth types, in which an angle formed between any two tilt directions is approximately equal to an integral multiple of 90 degrees. The first region has four liquid crystal domains of the first, second, third and fourth types, respectively, while each of the second and third regions has two liquid crystal domains selected from the four other liquid crystal domains of the first, second, third and fourth types, whereby the display quality of a VA mode LCD is improved.

11 Claims, 17 Drawing Sheets

U.S. PATENT DOCUMENTS

| | | | |
|---|---|---|---|
| 6,411,346 B1 | 6/2002 | Numano et al. | |
| 6,512,564 B1 | 1/2003 | Yoshida et al. | |
| 6,567,144 B1 * | 5/2003 | Kim et al. | 349/128 |
| 6,867,836 B2 | 3/2005 | Stalder et al. | |
| 6,919,942 B2 | 7/2005 | Aoki et al. | |
| 6,930,739 B2 | 8/2005 | Takeda et al. | |
| 6,937,311 B2 * | 8/2005 | Song et al. | 349/129 |
| 6,958,791 B2 | 10/2005 | Shimoshikiryo | |
| 7,379,143 B2 * | 5/2008 | Lyu | 349/130 |
| 7,995,147 B2 | 8/2011 | Diemer | |
| 7,995,177 B2 | 8/2011 | Shoraku et al. | |
| 8,064,018 B2 | 11/2011 | Shoraku et al. | |
| 2003/0071952 A1 * | 4/2003 | Yoshida et al. | 349/141 |
| 2003/0178628 A1 | 9/2003 | Aoki et al. | |
| 2003/0193625 A1 | 10/2003 | Yoshida et al. | |
| 2003/0227429 A1 | 12/2003 | Shimoshikiryo | |
| 2004/0001167 A1 | 1/2004 | Takeuchi et al. | |
| 2004/0222419 A1 | 11/2004 | Matsui et al. | |
| 2005/0052590 A1 | 3/2005 | Ochiai et al. | |
| 2005/0128397 A1 | 6/2005 | Sasaki et al. | |
| 2005/0200766 A1 | 9/2005 | Chen | |
| 2005/0237455 A1 * | 10/2005 | Fujioka et al. | 349/114 |
| 2005/0253797 A1 | 11/2005 | Kamada et al. | |
| 2006/0007194 A1 | 1/2006 | Verschueren et al. | |
| 2006/0028589 A1 * | 2/2006 | Um et al. | 349/33 |
| 2006/0038948 A1 | 2/2006 | Nishikawa et al. | |
| 2006/0050208 A1 | 3/2006 | Enomoto et al. | |
| 2006/0103803 A1 | 5/2006 | Jeon et al. | |
| 2006/0146234 A1 | 7/2006 | Bear et al. | |
| 2006/0146243 A1 * | 7/2006 | Nakanishi et al. | 349/139 |
| 2007/0222931 A1 * | 9/2007 | Chang et al. | 349/129 |
| 2008/0122772 A1 | 5/2008 | Takeuchi et al. | |
| 2009/0079923 A1 * | 3/2009 | Miyachi | 349/129 |
| 2009/0086141 A1 | 4/2009 | Shoraku et al. | |
| 2009/0225246 A1 | 9/2009 | Shoraku et al. | |
| 2009/0244462 A1 | 10/2009 | Tsubata | |
| 2009/0284703 A1 | 11/2009 | Shoraku et al. | |
| 2012/0002144 A1 | 1/2012 | Shoraku et al. | |

FOREIGN PATENT DOCUMENTS

| | | |
|---|---|---|
| JP | 08-179341 | 7/1996 |
| JP | 09-281497 | 10/1997 |
| JP | 10-161102 | 6/1998 |
| JP | 11-084421 | 3/1999 |
| JP | 11-352486 | 12/1999 |
| JP | 2003-107526 | 4/2003 |
| JP | 2004-062146 | 2/2004 |
| JP | 2005-024926 | 1/2005 |
| WO | 2006/121220 | 11/2006 |

OTHER PUBLICATIONS

Supplementary Search Report mailed May 27, 2010 in corresponding EP application 07832962.0.
International Preliminary Report on Patentability mailed in corresponding PCT Application No. PCT/.
International Search Report for PCT/JP2007/073342 mailed Mar. 4, 2008.
U.S. Appl. No. 11/916,604 (Shoraku et al.) filed Dec. 5, 2007.
U.S. Office Action mailed Aug. 27, 2010 in co-pending U.S. Appl. No. 12/297,931.
Office Action issued for U.S. Appl. No. 12/373,593, dated Jan. 30, 2012.
Office Action issued for U.S. Patent Application No. 12/295,672, dated Jun. 24, 2011.
Office Action issued for U.S. Appl. No. 13/067,835 dated Jun. 1, 2012.
Final Office Action issued for U.S. Appl. No. 12/295,672 dated Dec. 6, 2011.
International Search Report issued for PCT Application No. PCT/JP2007/058881 dated Jun. 5, 2007.
English Translation of the International Preliminary Report on Patentability issued for PCT Application No. PCT/JP2007/058881 dated Nov. 27, 2008.
International Search Report issued for PCT Application No. PCT/JP2007/057577 dated May 15, 2007.
English Translation of the International Preliminary Report on Patentability issued for PCT Application No. PCT/JP2007/057577 dated Nov. 27, 2008.
Supplementary European Search Report issued for European Patent Application No. 07742316.8 dated Mar. 8, 2010.
Notice of Allowance issued for U.S. Appl. No. 12/297,931 dated Aug. 5, 2011.
International Search Report issued for PCT Application No. PCT/JP2007/063315 dated Aug. 7, 2007.
English Translation of the International Preliminary Report on Patentability issued for PCT Application No. PCT/JP2007/063315 dated Jan. 29, 2009.
Supplementary European Search Report issued for European Patent Application No. 07768089.0 dated Jun. 7, 2010.

* cited by examiner

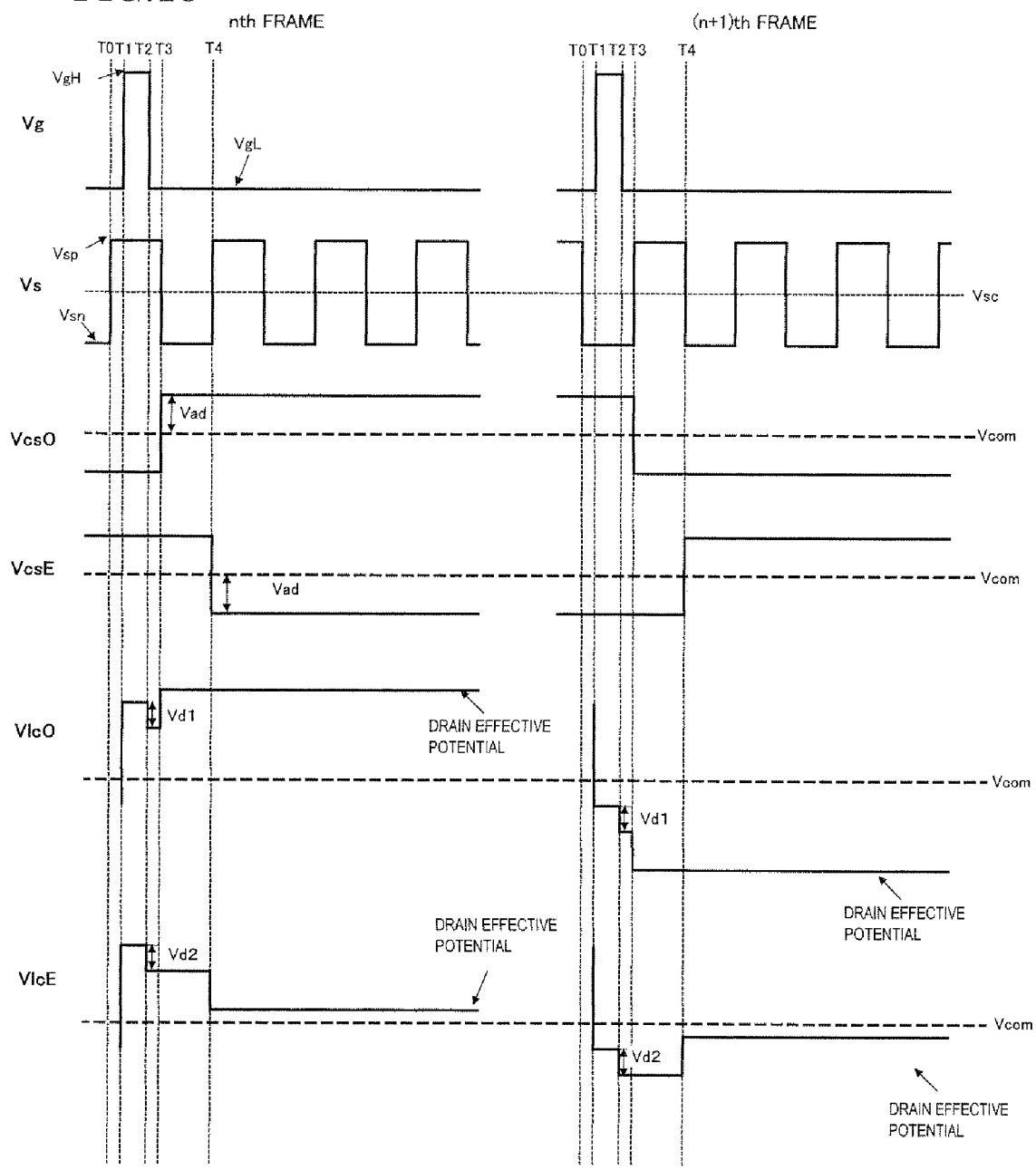

LIQUID CRYSTAL DISPLAY DEVICE

This application is the U.S. national phase of International Application No. PCT/JP2007/073342 filed 3 Dec. 2007 which designated the U.S. and claims priority to Japanese Patent Application No. 2006-328600 filed 5 Dec. 2006, the entire contents of each of which are hereby incorporated by reference.

TECHNICAL FIELD

The present invention generally relates to a liquid crystal display device and more particularly relates to a liquid crystal display device with a wide viewing angle characteristic.

BACKGROUND ART

Recently, the display performances of liquid crystal displays (LCDs) have been improved to the point that more and more manufacturers adopt LCD panels as TV monitors, for example. As a result of those researches and developments, the viewing angle characteristic of LCDs has been improved to a certain degree but not satisfactorily in some respects. Among other things, there is still a high demand for improvement of the viewing angle characteristic of an LCD using a vertical alignment liquid crystal layer (which is sometimes called a "VA mode LCD").

A VA mode LCD, which is currently used for a TV set with a big screen, for example, adopts a multi-domain structure, in which multiple liquid crystal domains are formed in a single pixel region, to improve the viewing angle characteristic of the display contrast ratio. An MVA mode is often adopted as a method of forming such a multi-domain structure. Specifically, according to the MVA mode, an alignment control structure is provided on one of the two substrates, which face each other with a vertical alignment liquid crystal layer interposed between them, so as to contact with the liquid crystal layer, thereby forming multiple domains with mutually different alignment directions (i.e., tilt directions), the number of which is typically four. As the alignment control structure, a slit (as an opening) or a rib (as a projection structure) may be provided for an electrode, thereby creating an anchoring force from both sides of the liquid crystal layer.

Also, to further improve the viewing angle characteristic of a VA mode LCD by resolving the problem that such an LCD will exhibit different γ (gamma) characteristics depending on whether the screen is viewed straight or obliquely (i.e., by reducing the degree of viewing angle dependence of the γ characteristic), a multi-pixel technology has been adopted more and more often these days (see Patent Document No. 1, for example). As used herein, the "γ characteristic" means the grayscale dependence of a display luminance and the "multi-pixel technology" refers to forming a single pixel of a number of subpixels that can display mutually different luminances so that a predetermined luminance is displayed in response to a display signal voltage that has been supplied to the pixel. That is to say, the multi-pixel technology is a method for reducing the viewing angle dependence of the γ characteristic of a pixel by synthesizing together those different γ characteristics of the subpixels.

Patent Document No. 1: Pamphlet of PCT International Application Publication No. 2006/038598
Patent Document No. 2: Japanese Patent Application Laid-Open Publication No. 11-133429
Patent Document No. 3: Japanese Patent Application Laid-Open Publication No. 11-352486

DISCLOSURE OF INVENTION

Problems to be Solved by the Invention

If such a multi-domain structure with a slit or a rib is adopted, however, the anchoring force will be applied onto liquid crystal molecules non-uniformly within a pixel region because the slit or rib has a linear structure unlike the situation where the pretilt directions are defined by an alignment film in a conventional TN mode LCD. As a result, the response speed may have a distribution unintentionally. In addition, since the transmittance of light will decrease in the areas with the slits or ribs, the brightness of the screen will decrease, too.

To avoid such a problem, the multi-domain structure is preferably formed by defining the pretilt directions with an alignment film for a VA mode LCD, too. Thus, the present inventors discovered and confirmed via experiments that a unique misalignment occurs in a VA mode LCD and affects its display quality.

Even in a conventional LCD in which the multi-domain structure is formed using an alignment film, a technique of providing a shielding portion for cutting the light that has been transmitted through an area with misalignment to minimize the deterioration in display quality due to the misalignment is also known (see Patent Document No. 1, for example). The conventional multi-domain structure is provided with such a shielding portion to shield an area with an optical transmittance that is higher than a predetermined value (i.e., an area that looks brighter when viewed straight than an area where liquid crystal molecules are aligned normally) due to a misalignment such as a reverse tilt in a TN mode LCD, for example. However, the present inventors discovered that the display quality of a VA mode LCD could not be improved sufficiently just by shielding such an area that looked brighter when viewed straight than an area where Liquid crystal molecules were aligned normally (see PCT International Application No. PCT/JP2006/311640).

Furthermore, nobody has ever taught or suggested what the best multi-domain structure would be to achieve a good display quality in a situation where a multi-domain structure with alignment films is applied to a multi-pixel structure such as the one disclosed in Patent Document No. 1.

It is therefore an object of the present invention to provide a VA mode liquid crystal display device with excellent display quality.

Means for Solving the Problems

In a liquid crystal display device according to the present invention, each pixel region includes: a vertical alignment liquid crystal layer; first and second substrates, which face each other with the liquid crystal layer interposed between them, first, second and third subpixel electrodes, which are arranged on one side of the first substrate with the liquid crystal layer; a counter electrode, which is arranged on one side of the second substrate with the liquid crystal layer to face the first, second and third subpixel electrodes; and at least one alignment film, which is arranged in contact with the liquid crystal layer. The second and third subpixel electrodes are arranged to interpose the first subpixel electrode between them. Each pixel region is comprised of first, second and third regions associated with the first, second and third subpixel electrodes, respectively. Each pixel region includes eight liquid crystal domains in total, consisting of two sets of four liquid crystal domains of first, second, third and fourth types, in which liquid crystal molecules are tilted in first, second, third and fourth directions, respectively, around the center of a plane, and approximately at the middle of the thickness, of the liquid crystal layer in response to a voltage applied. The first, second, third and fourth directions are defined such that an angle formed between any two of the four directions is approximately equal to an integral multiple of 90 degrees. The first region has four liquid crystal domains of the first, second, third and fourth types, respectively, while each of the second and third regions has two liquid crystal domains selected from the four other liquid crystal domains of the first, second, third and fourth types.

In one preferred embodiment, each of the two liquid crystal domains that each of the second and third regions has is of the same type as an adjacent one of the four liquid crystal domains that the first region has.

In another preferred embodiment, in each of the first, second and third regions, each pair of adjacent liquid crystal domains have tilt directions that are different from each other by approximately 90 degrees.

In still another preferred embodiment, in each said pixel region, the combined area of the two liquid crystal domains of one of the first, second, third and fourth types is equal to that of the two liquid crystal domains of any of the three other types.

In yet another preferred embodiment, in the second and third regions, the respective areas of the liquid crystal domains of the first, second, third and fourth types are equal to each other.

In yet another preferred embodiment, the first region has a first luminance and the luminances of the second and third regions are substantially equal to other and represented as a second luminance. When the pixel region displays a certain grayscale level, the first and second luminances are different from each other, and the certain grayscale level corresponds to a luminance between the first and second luminances.

In yet another preferred embodiment, when the pixel region displays a certain grayscale level, the first luminance is higher than the second luminance.

In this particular preferred embodiment, in the pixel region, the combined area of the second and third regions is approximately three times as large as the area of the first region.

In yet another preferred embodiment, when the pixel region displays a certain grayscale level, each of the liquid crystal domains of the first, second, third and fourth types that the first, second and third regions have produces a dark area, which looks darker than the region with the first or second luminance that includes the liquid crystal domain for a viewer located in front of the device, inside of, and substantially parallel to, an edge portion of the first, second or third subpixel electrode. The first substrate includes a shielding member, which includes a shielding portion for selectively shielding at least a part of the dark area from incoming light.

In yet another preferred embodiment, in the first region, the liquid crystal domain of the first type is located close to at least a part of an edge of the first subpixel electrode. The part includes a first edge portion in which an azimuthal direction that is perpendicular to the part and that points toward the inside of the first subpixel electrode defines an angle greater than 90 degrees with respect to the first direction. The liquid crystal domain of the second type is located close to at least a part of another edge of the first subpixel electrode. The part includes a second edge portion in which an azimuthal direction that is perpendicular to the part and that points toward the inside of the first subpixel electrode defines an angle greater than 90 degrees with respect to the second direction. The liquid crystal domain of the third type is located close to at least a part of another edge of the first subpixel electrode. The part includes a third edge portion in which an azimuthal direction that is perpendicular to the part and that points toward the inside of the first electrode defines an angle greater than 90 degrees with respect to the third direction. The liquid crystal domain of the fourth type is located close to at least a part of another edge of the first subpixel electrode. The part includes a fourth edge portion in which an azimuthal direction that is perpendicular to the part and that points toward the inside of the first subpixel electrode defines an angle greater than 90 degrees with respect to the fourth direction. The shielding member includes at least one of first, second, third and fourth shielding portions for selectively shielding at least a part of the first, second, third or fourth edge portion from incoming light.

In yet another preferred embodiment, in the second and third regions, the liquid crystal domain of the first type is located close to at least a part of an edge of the second or third subpixel electrode. The part includes a first edge portion in which an azimuthal direction that is perpendicular to the part and that points toward the inside of the second or third subpixel electrode defines an angle greater than 90 degrees with respect to the first direction. The liquid crystal domain of the second type is located close to at least a part of another edge of the second or third subpixel electrode. The part includes a second edge portion in which an azimuthal direction that is perpendicular to the part and that points toward the inside of the second or third subpixel electrode defines an angle greater than 90 degrees with respect to the second direction. The liquid crystal domain of the third type is located close to at least a part of another edge of the second or third subpixel electrode. The part includes a third edge portion in which an azimuthal direction that is perpendicular to the part and that points toward the inside of the second or third electrode defines an angle greater than 90 degrees with respect to the third direction. The liquid crystal domain of the fourth type is located close to at least a part of another edge of the second or third subpixel electrode. The part includes a fourth edge portion in which an azimuthal direction that is perpendicular to the part and that points toward the inside of the second or third subpixel electrode defines an angle greater than 90 degrees with respect to the fourth direction. The shielding member includes at least one of first, second, third and fourth shielding portions for selectively shielding at least a part of the first, second, third or fourth edge portion from incoming light.

In yet another preferred embodiment, in the first region, the shielding member includes a central shielding portion for selectively shielding at least a part of a boundary area between any two of the four liquid crystal domains of the first, second, third and fourth types from incoming light.

In yet another preferred embodiment, in the second and third regions, the shielding member includes a central shielding portion for selectively shielding at least a part of a boundary area between any two of the four liquid crystal domains of the first, second, third and fourth types from incoming light.

In yet another preferred embodiment, the first substrate further includes a gate bus line, a source bus line, a drain extension line, and a storage capacitor line (which will also be referred to herein as a "CS bus line"). At least one of the first, second, third, fourth, and central shielding portions is defined by a portion of at least one line selected from the group consisting of the gate bus line, the source bus line, the drain extension line, and the storage capacitor line.

In yet another preferred embodiment, the second substrate further includes a black matrix layer, and at least one of the first, second, third, fourth, and central shielding portions is defined by a portion of the black matrix layer.

In yet another preferred embodiment, within the pixel region, the first, second and third regions are arranged in the column direction. And at least a part of the central shielding portion provided for each of the first, second and third regions is defined by the drain extension line.

In yet another preferred embodiment, within the pixel region, the first, second and third regions are arranged in the column direction. The pixel region further includes a first storage capacitor line between the first and second regions and a second storage capacitor line between the first and third regions. At least a part of any of the first, second, third and fourth shielding portions that is parallel to the column direction is defined by an extended portion of the first or second storage capacitor line. Only a part of the shielding portion that is parallel to the column direction is defined by an extended portion of the first or second storage capacitor line. And the shielding portion defined by an extended portion of the first or second storage capacitor line that is provided for two pixel regions that are adjacent to each other in the row direction is arranged symmetrically with respect to the center of the two pixel regions that are adjacent to each other in the row direction.

Effects of the Invention

The present invention provides a VA mode liquid crystal display device with a good display quality. More particularly, in a VA mode liquid crystal display device with a multi-domain structure that uses an alignment film for the multi-pixel structure disclosed in Patent Document No. 1, for example, the domain line (or dark area) produced in a pixel can be reduced. Consequently, the display quality of a high-definition liquid crystal display device can be improved, among other things.

Figure 2:
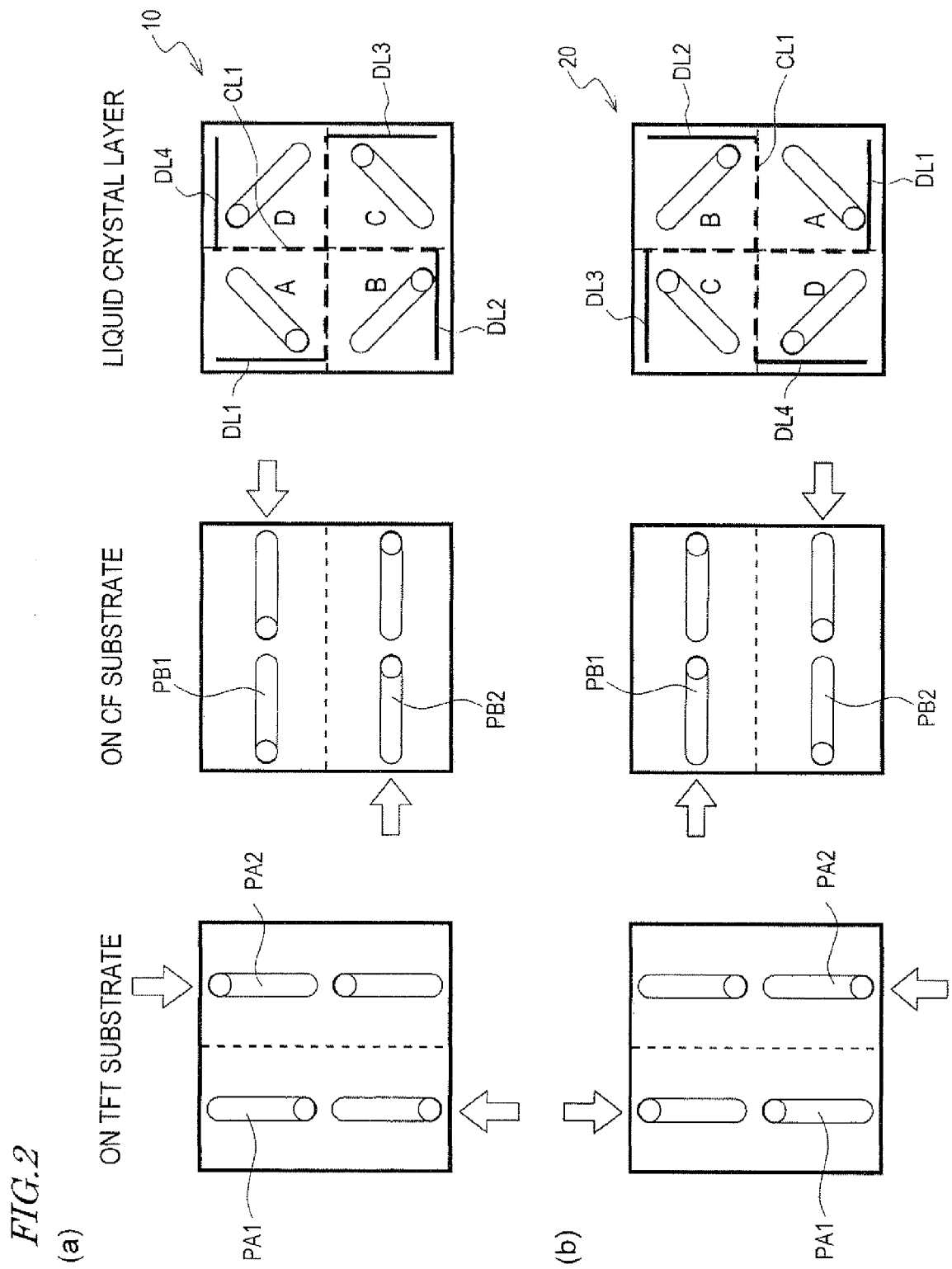

Portions (a) and (b) of FIG. 2 illustrate an exemplary pixel region with a multi-domain structure in a VA mode liquid crystal display device according to the present invention.

Figure 3:
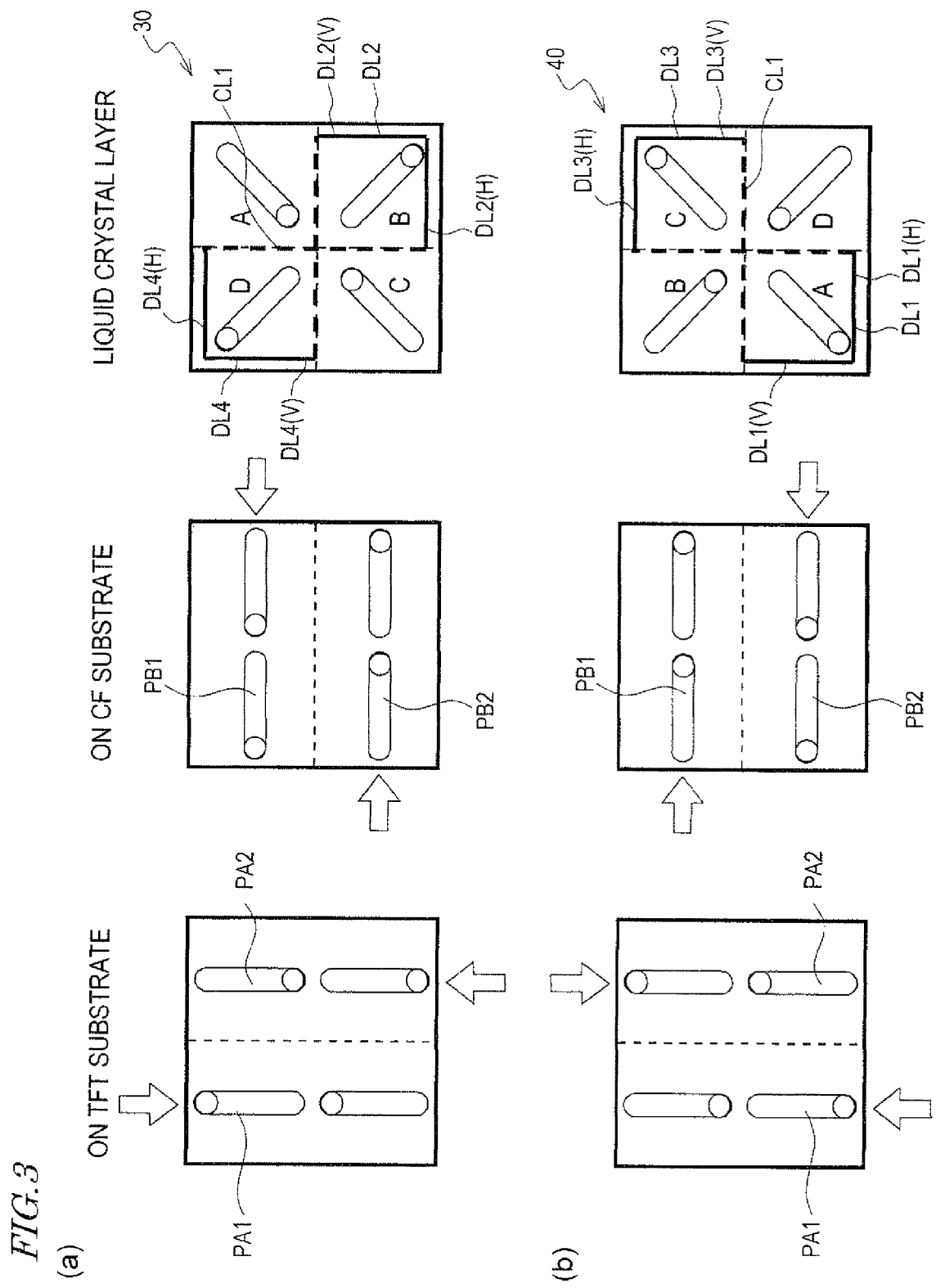

Portions (a) and (b) of FIG. 3 illustrate another exemplary pixel region with a multi-domain structure in a VA mode liquid crystal display device according to the present invention.

Figure 4:
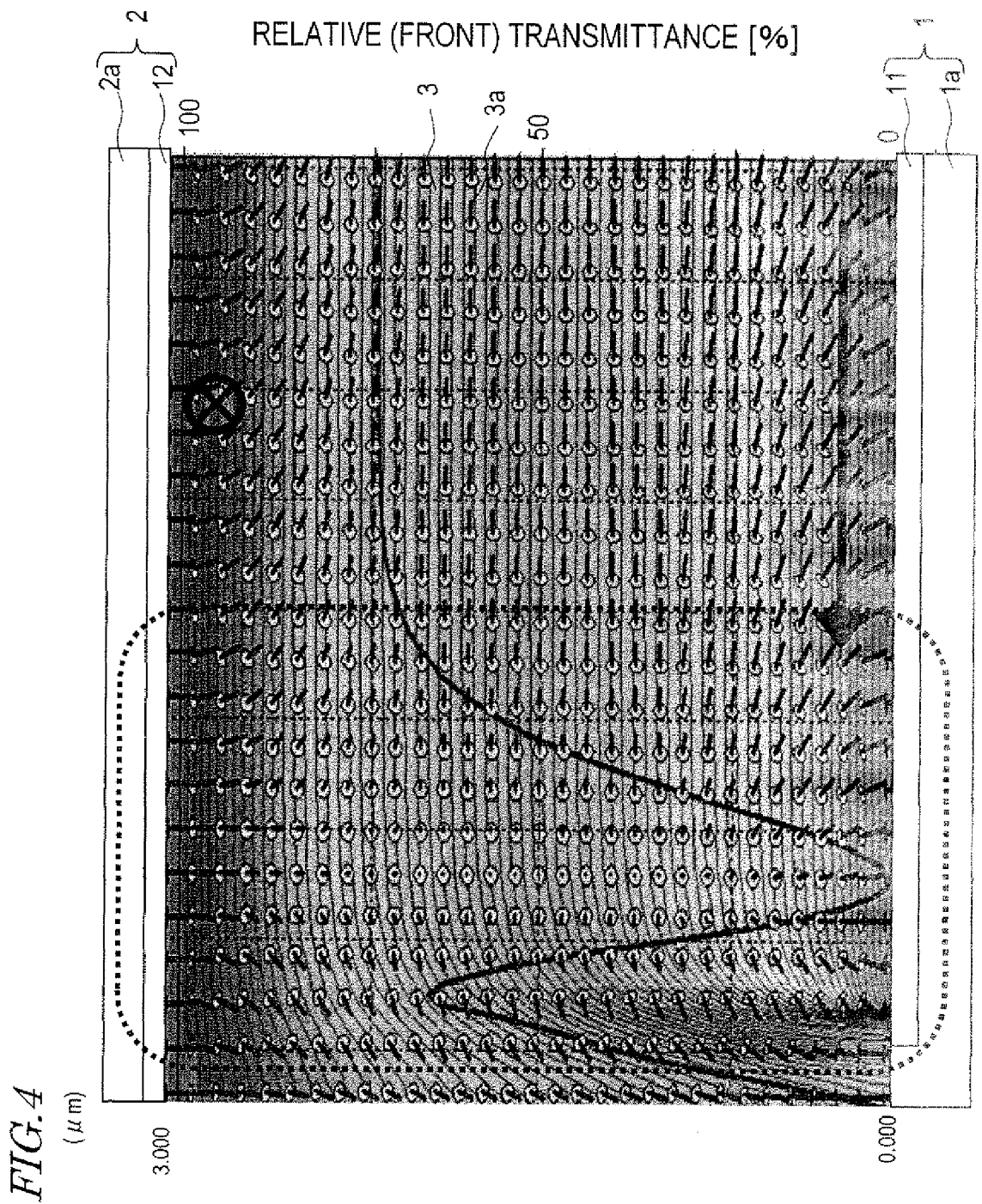

FIG. 4 is a cross-sectional view of a pixel region of a VA mode liquid crystal display device according to the present invention, showing the equipotential curve of an electric field created in the liquid crystal layer, the orientation directions of liquid crystal molecules in the layer, and the transmittance thereof, which were figured out by simulations.

Figure 5:
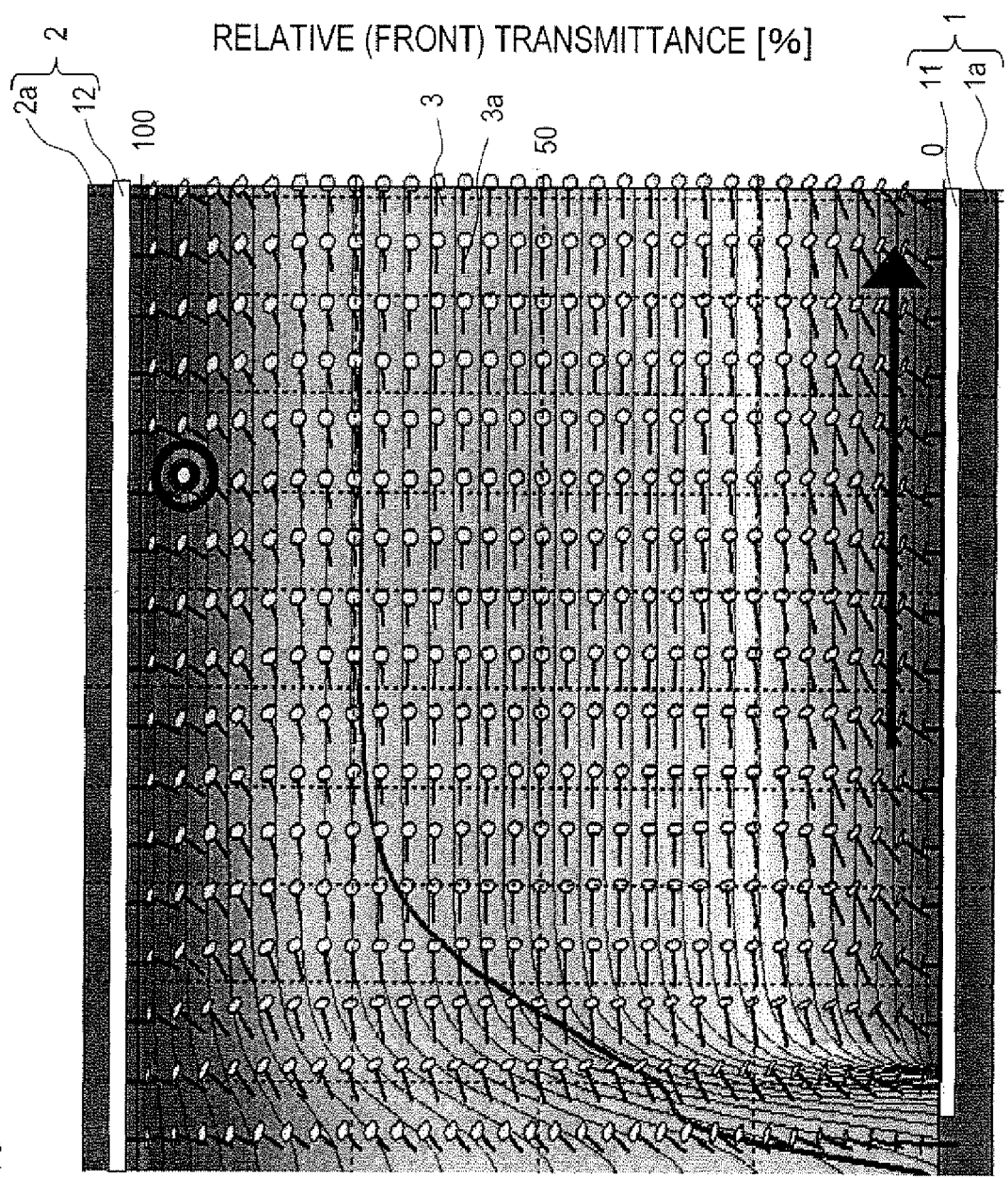

FIG. 5 is a cross-sectional view of a pixel region of a VA mode liquid crystal display device according to the present invention, showing the equipotential curve of an electric field created in the liquid crystal layer, the orientation directions of liquid crystal molecules in the layer, and the transmittance thereof, which were figured out by simulations.

Figure 6:
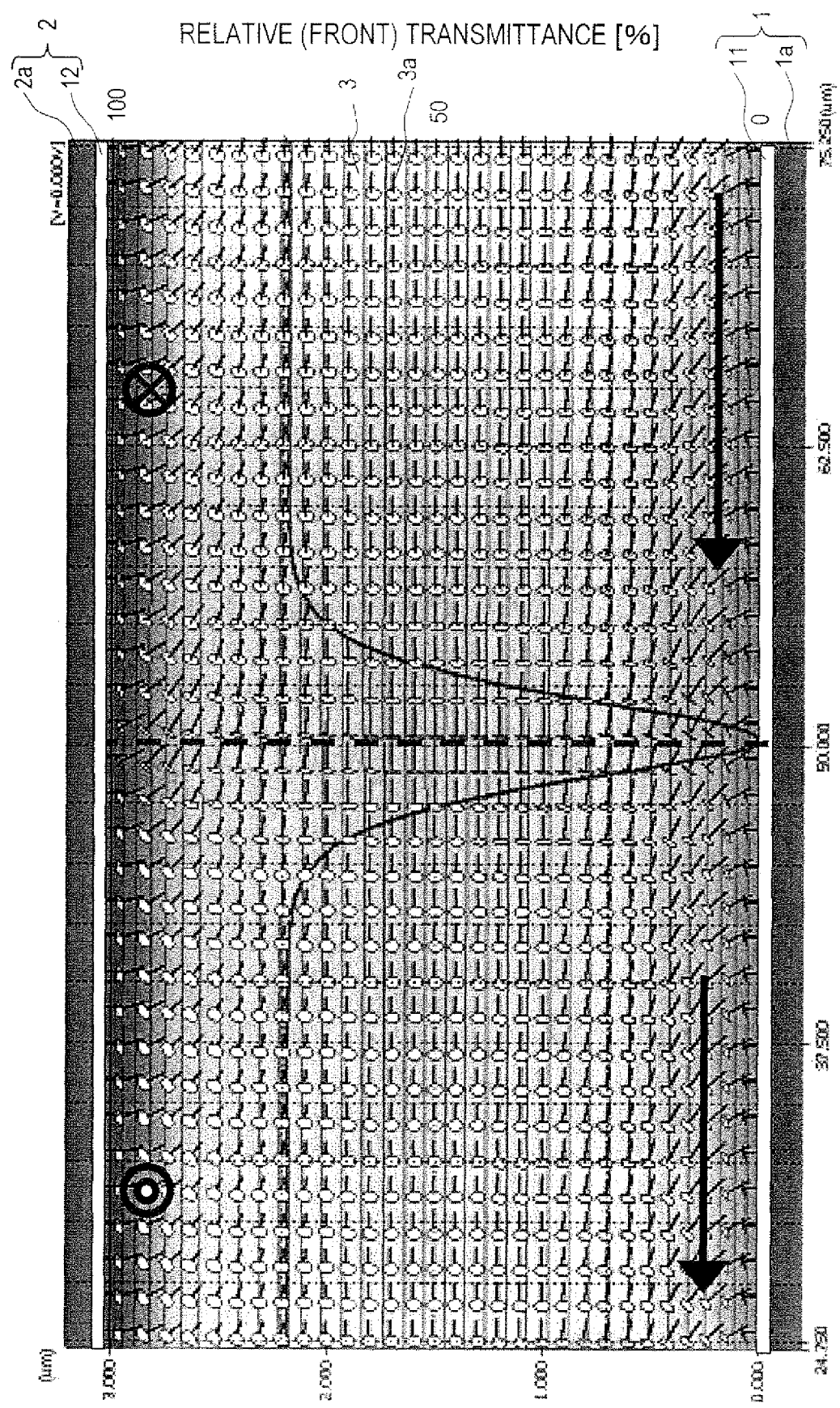

FIG. 6 is a cross-sectional view of a pixel region of a VA mode liquid crystal display device according to the present invention, showing the equipotential curve of an electric field created in the liquid crystal layer, the orientation directions of liquid crystal molecules in the layer, and the transmittance thereof, which were figured out by simulations.

Figure 7:
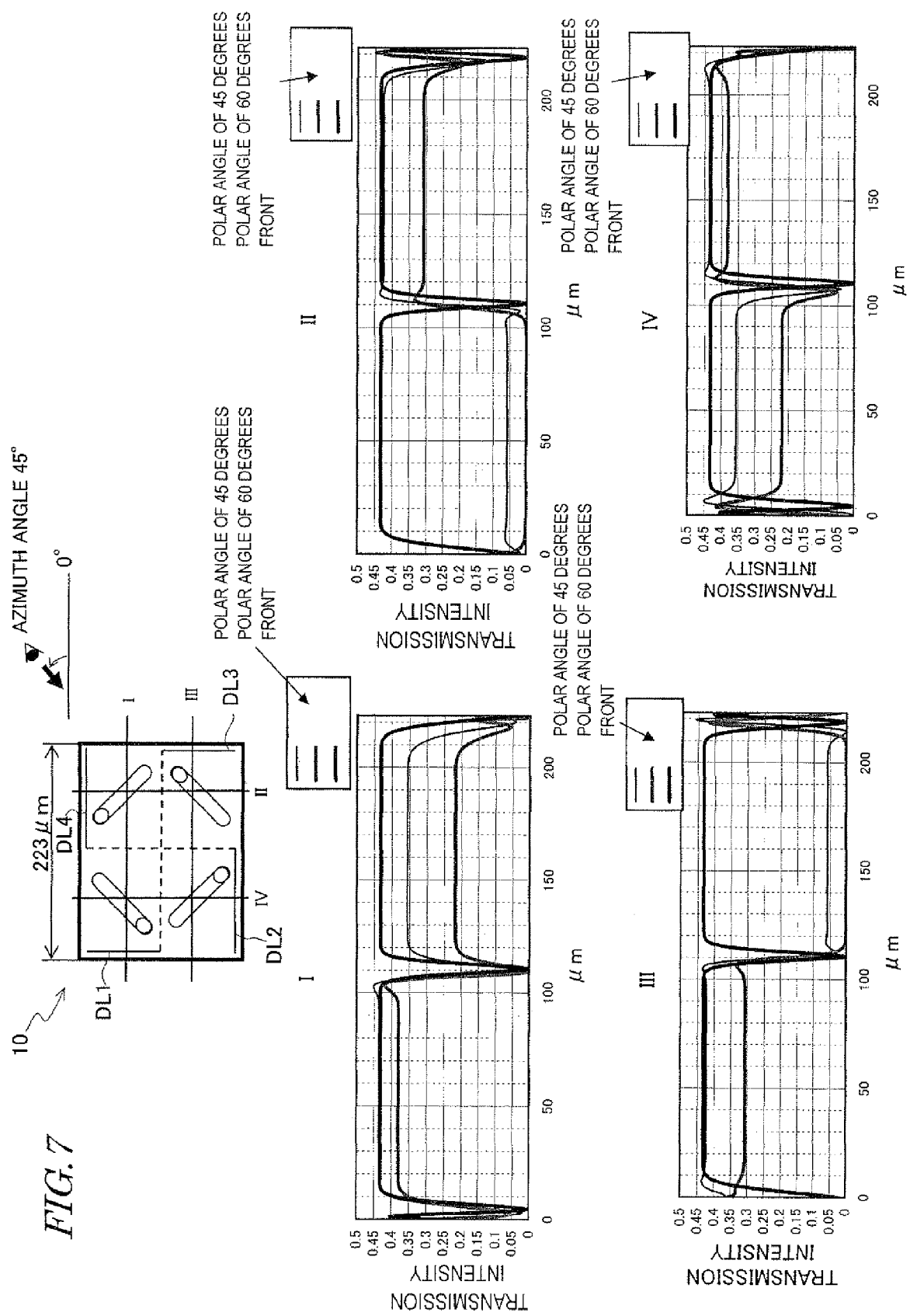

FIG. 7 is graphs showing the distributions of transmission intensities in a situation where the pixel region shown in portion (a) of FIG. 2 is viewed from the direction defined by an azimuth angle of 45 degrees.

FIGS. 8(a) and 8(b) are schematic representations illustrating a multi-domain structure as a specific example of the present invention and a multi-domain structure as a comparative example.

Figure 8:
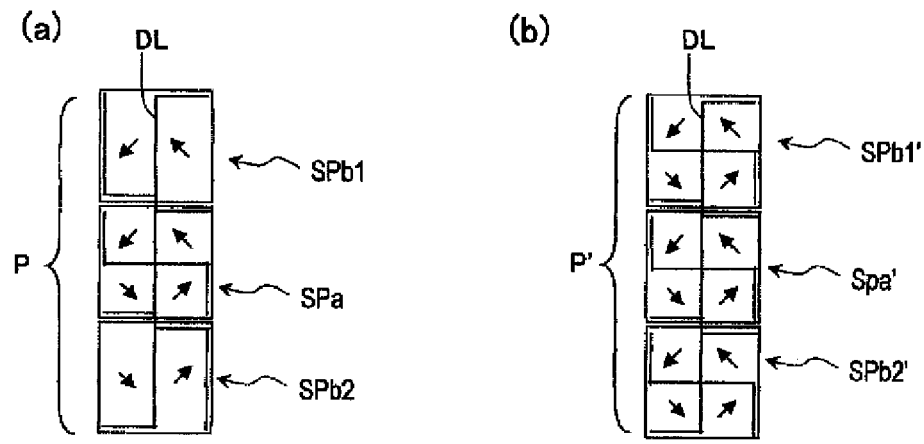
Figure 9A:
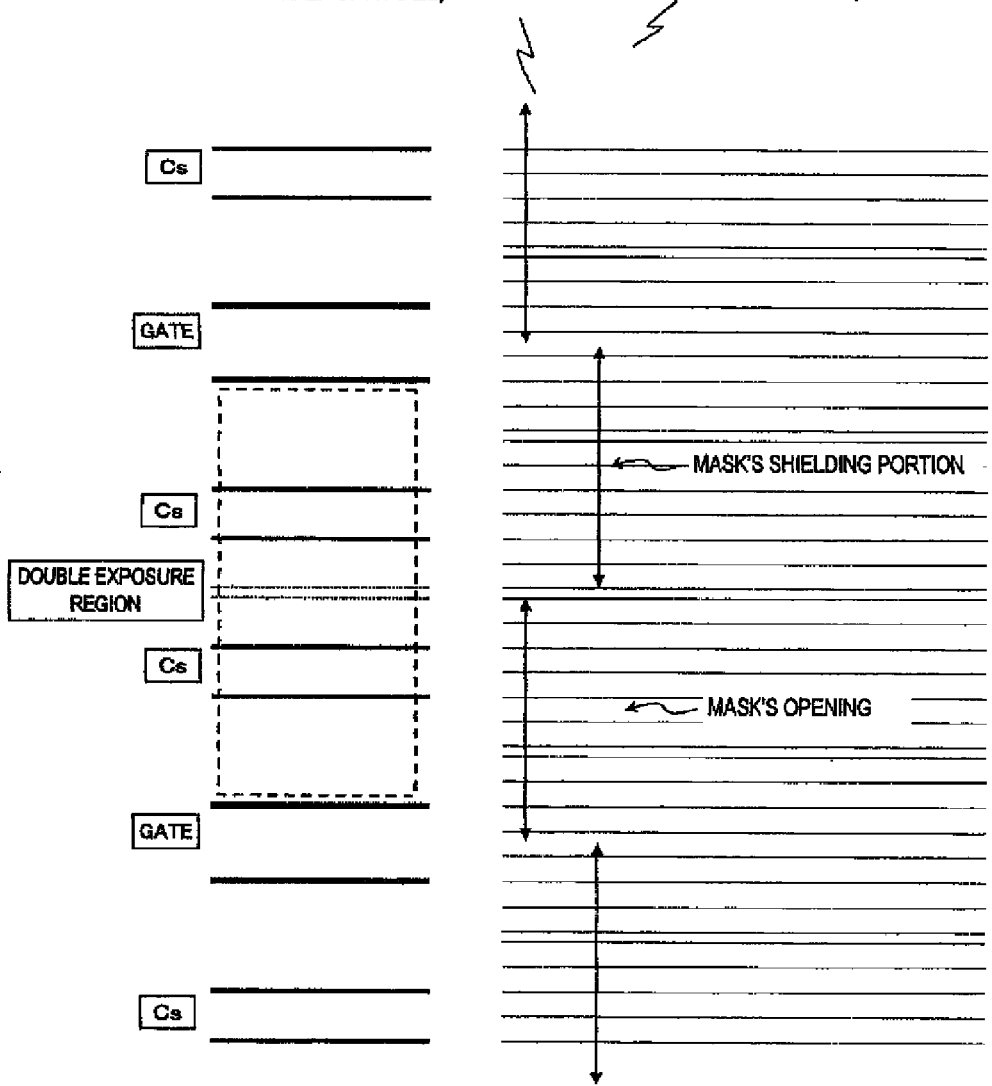

FIG. 9A illustrates how to make a mask alignment on an optical alignment film on a CF substrate during a photolithographic process to form the multi-domain structure of this specific example shown in FIG. 8(a) at a division ratio of 1 to 1 to 1.

Figure 9B:
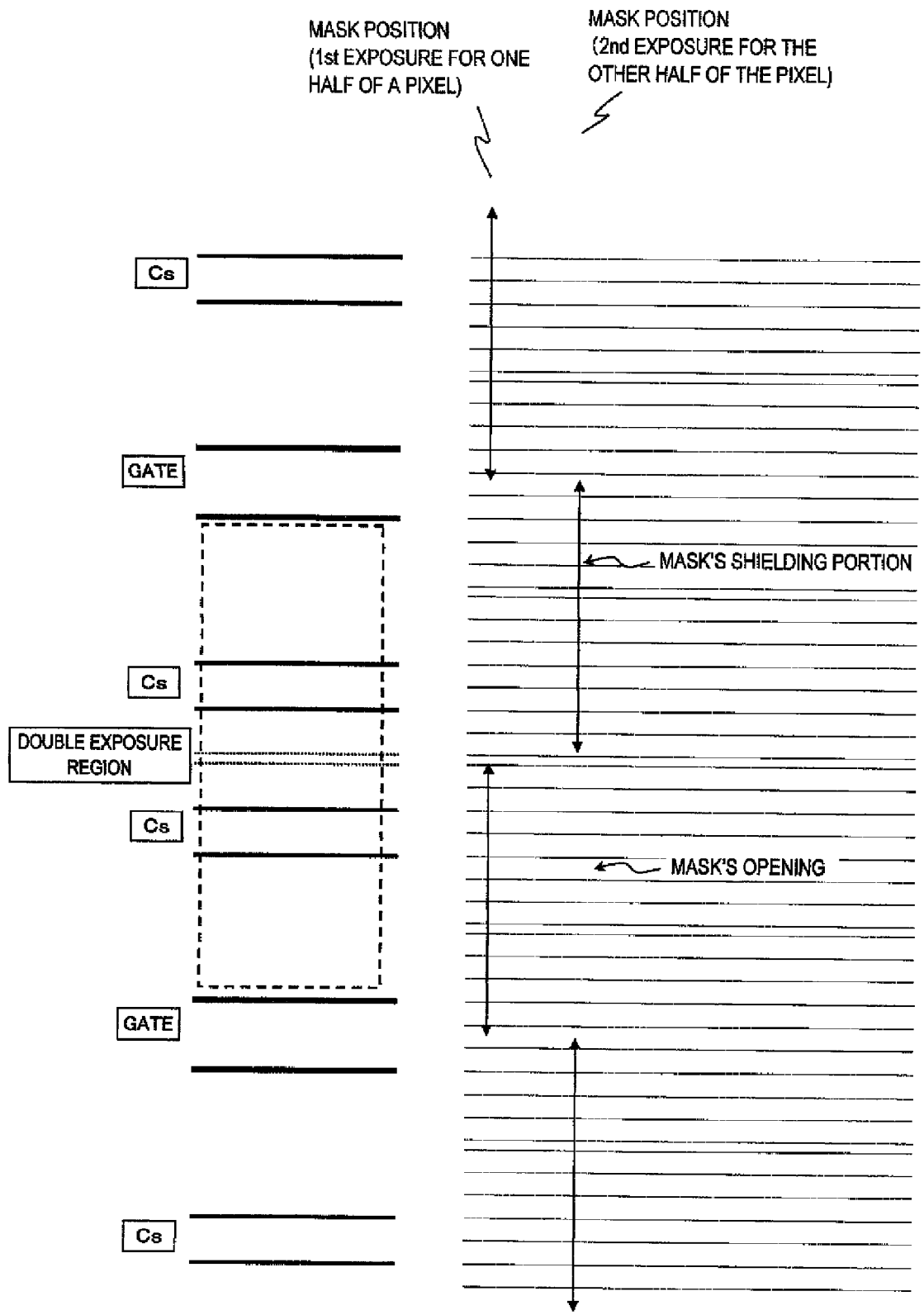

FIG. 9B illustrates how to make a mask alignment on an optical alignment film on a CF substrate during a photolithographic process to form the multi-domain structure of this specific example shown in FIG. 8(a) at a division ratio of 1.5 to 1 to 1.5.

Figure 10A:
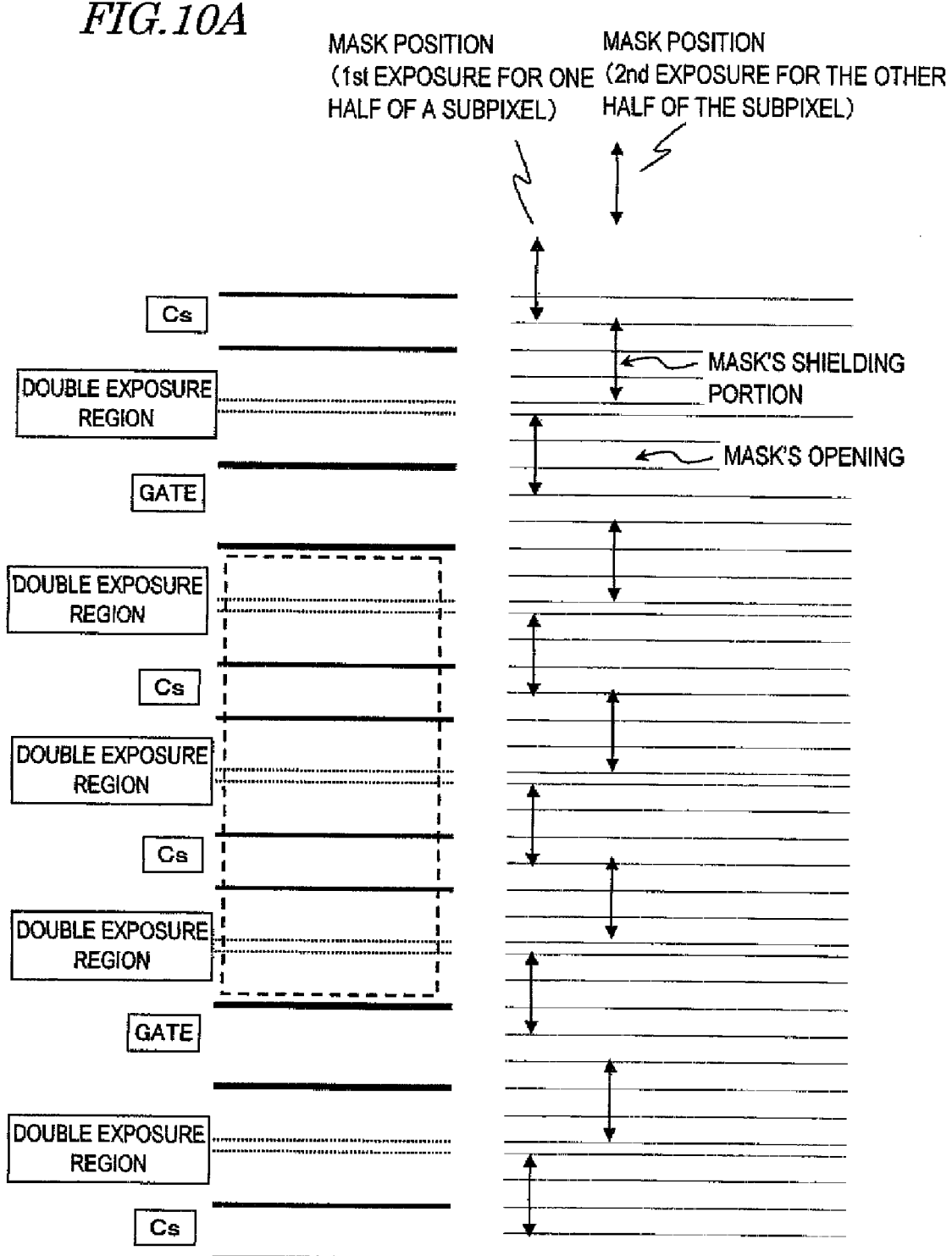

FIG. 10A illustrates how to make a mask alignment on an optical alignment film on a CF substrate during a photolithographic process to form the multi-domain structure of the comparative example shown in FIG. 8(b) at a division ratio of 1 to 1 to 1.

Figure 10B:
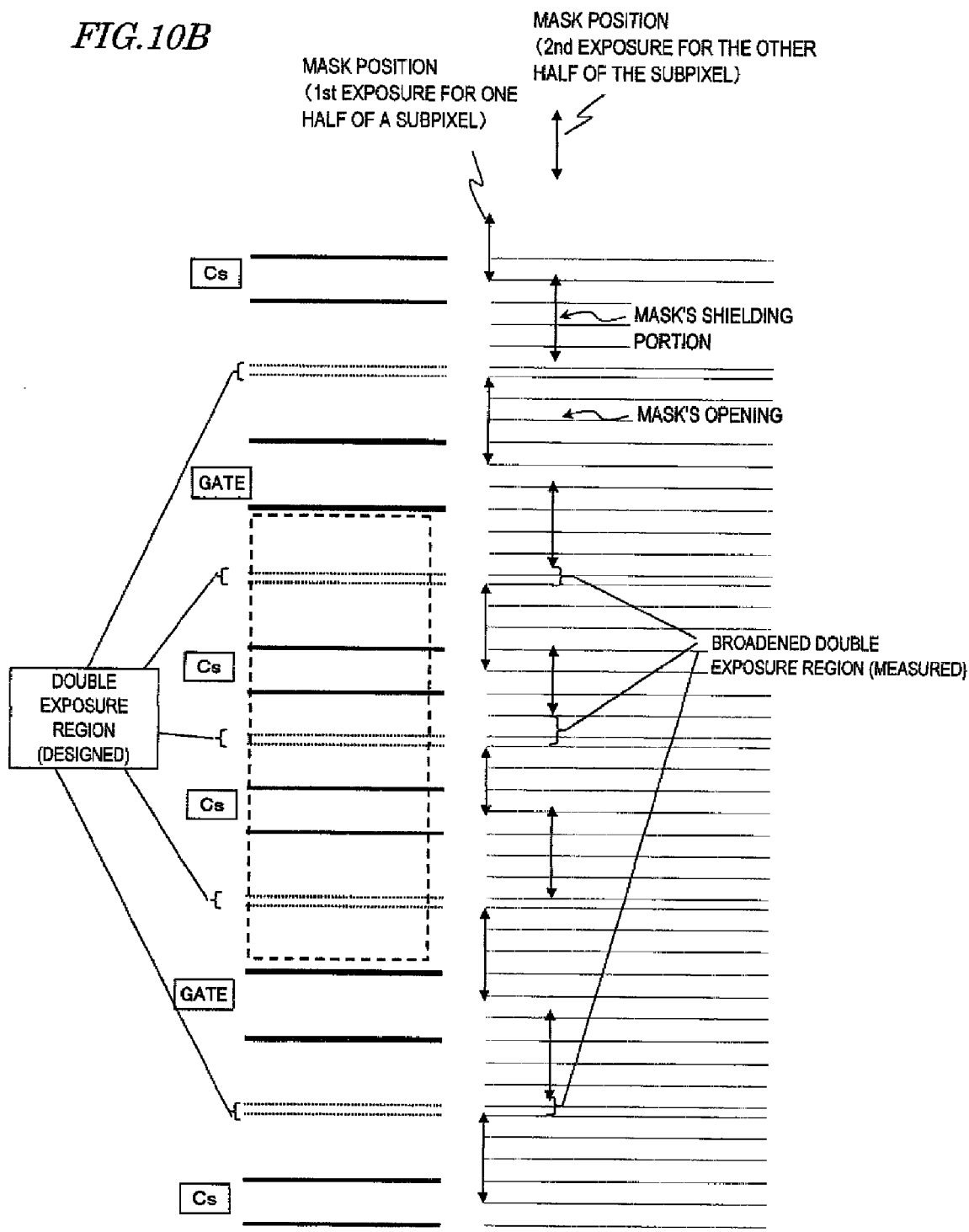

FIG. 10B illustrates how to make a mask alignment on an optical alignment film on a CF substrate during a photolithographic process to form the multi-domain structure of the comparative example shown in FIG. 8(b) at a division ratio of 1.5 to 1 to 1.5.

Figure 11:
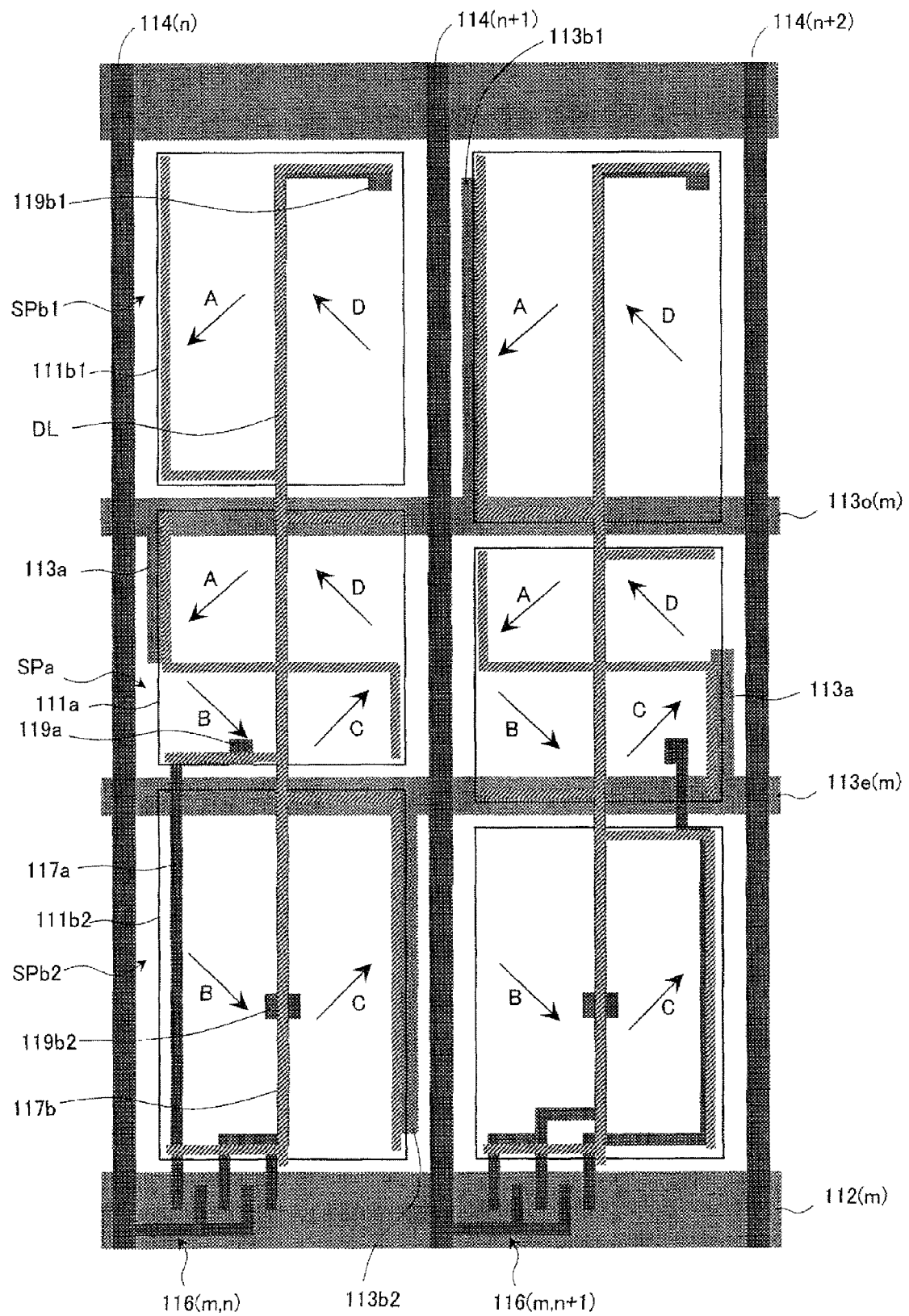

FIG. 11 is a schematic representation illustrating an exemplary pixel structure for a liquid crystal display device as a preferred embodiment of the present invention.

Figure 12:
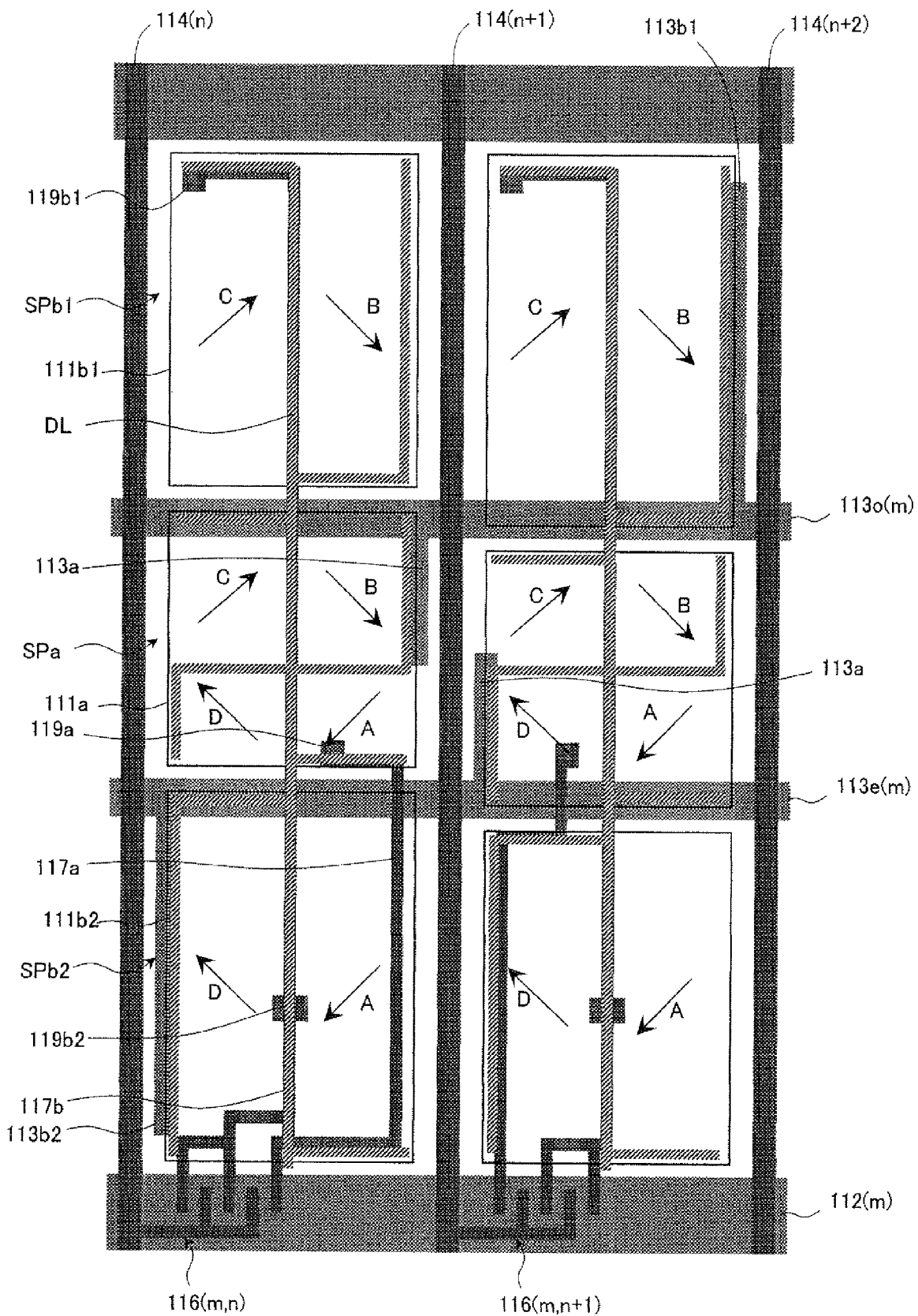

FIG. 12 is a schematic representation illustrating another exemplary pixel structure for a liquid crystal display device as a preferred embodiment of the present invention.

Figure 13:
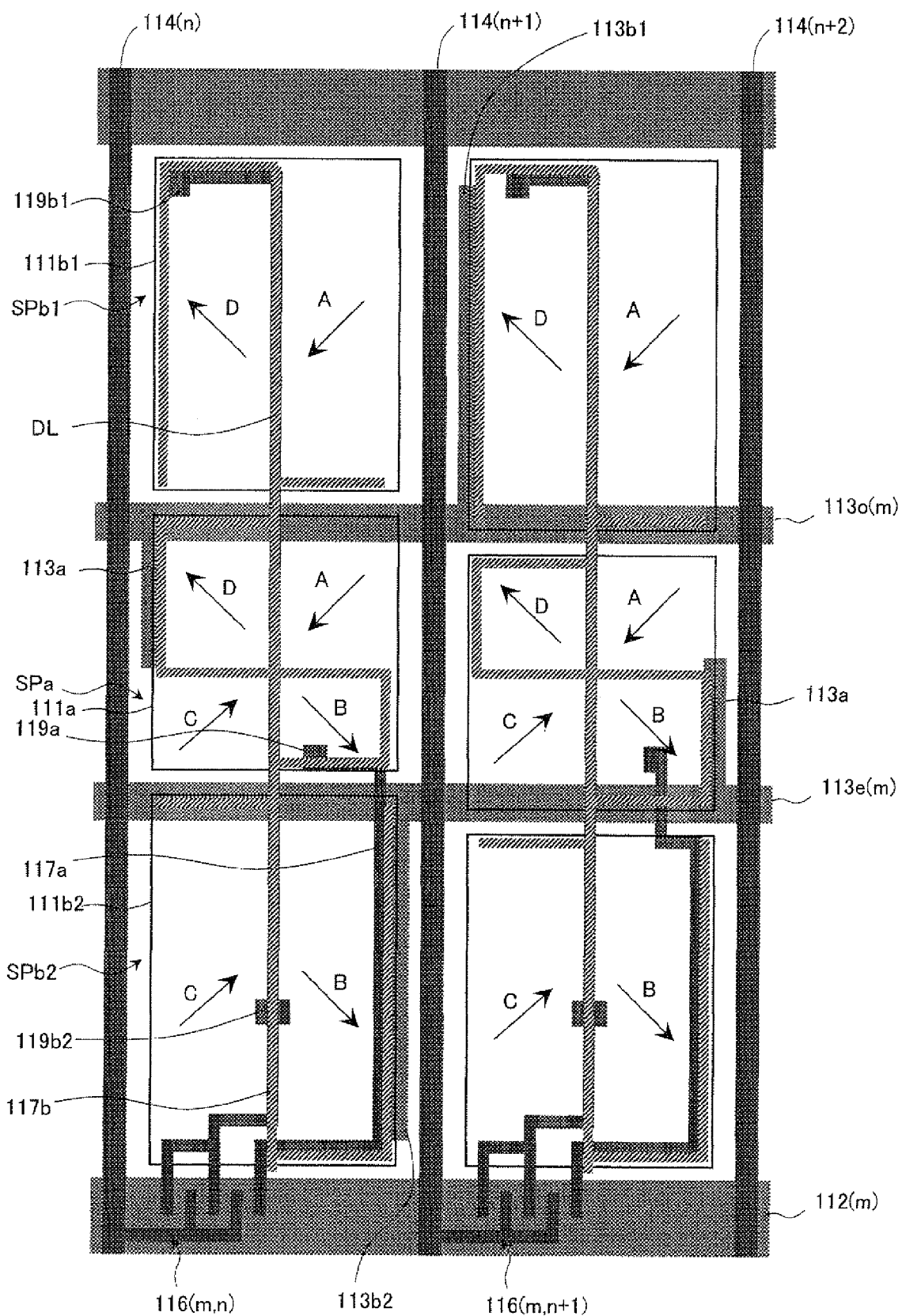

FIG. 13 is a schematic representation illustrating still another exemplary pixel structure for a liquid crystal display device as a preferred embodiment of the present invention.

Figure 14:
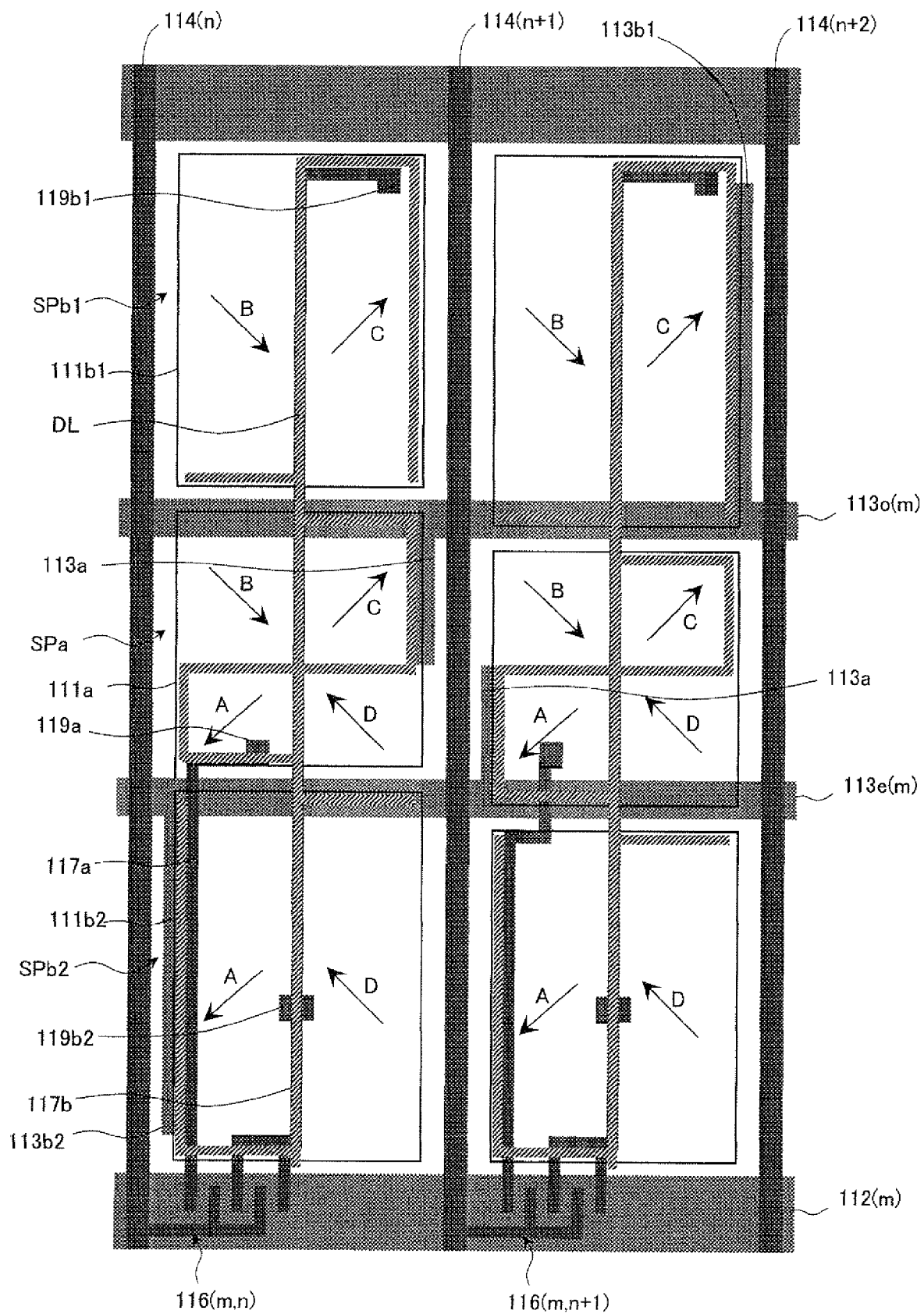

FIG. 14 is a schematic representation illustrating yet another exemplary pixel structure for a liquid crystal display device as a preferred embodiment of the present invention.

Figure 15:
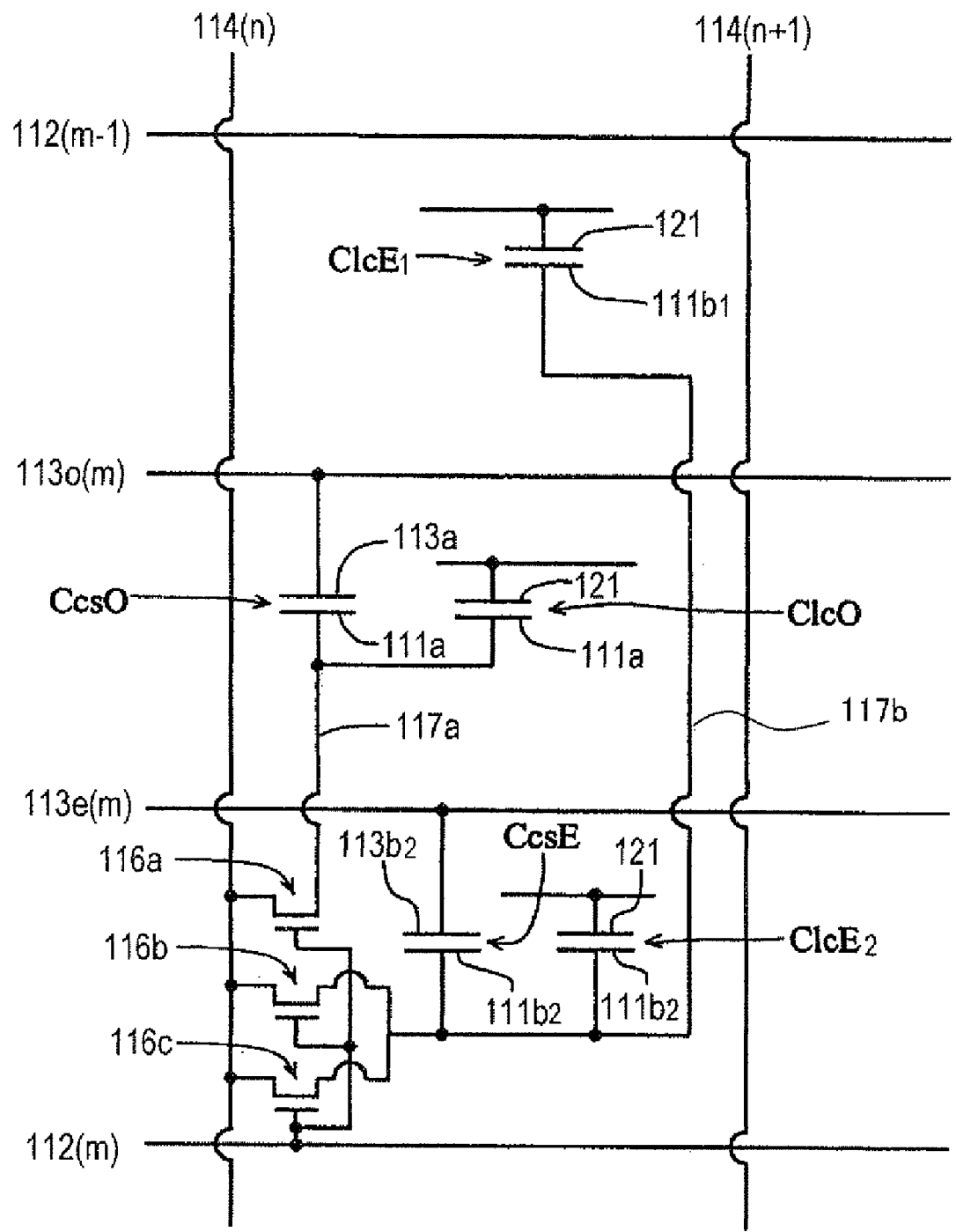

FIG. 15 is an equivalent circuit diagram representing a pixel at the intersection between the $m^{th}$ row and the $n^{th}$ column of the pixel structures shown in FIGS. 11 through 14.

FIG. 16 shows the respective waveforms of a gate signal, a source signal (display signal), CS signals (representing storage capacitor counter voltages) and pixel voltages (which are the voltages applied to the liquid crystal capacitors of respective subpixels) in the liquid crystal display device with the pixel structure represented by the equivalent circuit diagram shown in FIG. 15.

DESCRIPTION OF REFERENCE NUMERALS

1 TFT substrate
1a, 2a transparent substrate
2 CF substrate
3 liquid crystal layer
3a liquid crystal molecule
10 pixel region
11 pixel electrode
12 counter electrode
111a, 111b1, 111b2 subpixel electrode
112 gate bus line
113, 113e, 113o CS bus line (storage capacitor line)
113a, 113b1, 113b2 extended portion of CS bus line
114 source bus line
116, 116a, 116b, 116c TFT
117a, 117b drain extension line
119a, 119b1, 119b2 contact portion (contact hole)
SD1 to SD4 edges of pixel electrode
EG1 to EG4 edge portions of pixel electrode A to D liquid crystal domain
t1 to t4 tilt direction (reference alignment direction)
e1 to e4 azimuth direction that is perpendicular to edge of pixel electrode and pointed inward in pixel electrode

BEST MODE FOR CARRYING OUT THE INVENTION

Hereinafter, preferred embodiments of a liquid crystal display device according to the present invention will be described with reference to the accompanying drawings. However, the present invention is in no way limited to the following specific preferred embodiments.

A liquid crystal display device as a preferred embodiment of the present invention includes a vertical alignment liquid crystal layer, of which the pretilt direction is controlled with at least one alignment film, and has not only a multi-domain structure but also a multi-pixel structure. Since the pretilt direction is defined with an alignment film without using any linear alignment control structure such as a slit or a rib, the anchoring force on liquid crystal molecules will be uniform within each pixel region and the response speed will not have any distribution, for example. On top of that, the transmittance of light will never decrease in a region with a slit or a rib, and therefore, the display luminance can be increased. The multi-domain structure contributes mainly to reducing the viewing angle dependence of the contrast ratio, while the multi-pixel structure contributes mostly to reducing the viewing angle dependence of the $\gamma$ characteristic.

As used herein, the "vertical alignment liquid crystal layer" means a liquid crystal layer in which the axis of liquid crystal molecules (which will be sometimes referred to herein as an "axis direction") defines a tilt angle of approximately 85 degrees or more with respect to the surface of a vertical alignment film. Liquid crystal molecules have negative dielectric anisotropy and are combined with polarizers that are arranged as crossed Nicols to get a display operation done in normally black mode. The alignment film may be provided for at least one of the two substrates. However, to stabilize the alignment, each of the two substrates is preferably provided with an alignment film. In the preferred embodiment to be described below, each of the two substrates is provided with a vertical alignment film. Also, since every misalignment occurs within the multi-domain structure except the one occurring in an electrode edge portion, a four-domain structure that realizes a particularly good viewing angle characteristic will be described as an example.

As used herein, a "pixel" refers to a minimum unit for representing a particular gray scale level on the screen, and corresponds to a unit for representing each gray scale level of P, G and B in color display and is also called a "dot". A combination of R, G and B pixels forms a single color display pixel. A "pixel region" refers to a region of a liquid crystal display device that is allocated to a single "pixel" on the screen. Also, a "subpixel" refers herein to one of multiple units that are included in a single pixel and that can display mutually different luminances. And those subpixels display a predetermined luminance (or grayscale level) with respect to the display signal voltage applied to a pixel. A "subpixel region" is a region of the liquid crystal display device allocated to each of those subpixels.

A "pretilt direction" is the orientation direction of liquid crystal molecules to be controlled with an alignment film and refers to an azimuth (i.e., a direction represented by an azimuth angle) on a display screen. Also, the angle formed by liquid crystal molecules with respect to the surface of the alignment film in this case will be referred to herein as a "pretilt angle". The pretilt direction will be defined by subjecting the alignment film to a rubbing treatment or an optical alignment treatment. By changing the combinations of the pretilt directions of the two alignment films that face each other with the liquid crystal layer interposed between them, a multidomain structure can be formed. The multi-domain pixel region includes the same number of liquid crystal domains (which will be sometimes simply referred to herein as "domains") as the number of division. Each of these liquid crystal domains is characterized by the tilt direction of liquid crystal molecules at the center of a plane of the liquid crystal layer and the middle of the thickness of the liquid crystal layer, when a voltage is applied across the liquid crystal layer. Such a tilt direction will be sometimes referred to herein as a "reference alignment direction". And this tilt direction (or reference alignment direction) will have a decisive effect on the viewing angle dependence of each domain. The tilt direction is also represented by the azimuth on the screen (i.e., the azimuthal direction). The reference azimuth is supposed to be the horizontal direction on the screen and the azimuth angle is supposed to increase counterclockwise. For example, comparing the display screen to a clock face, the three o'clock direction is supposed to have an azimuth angle of zero degrees and the angle is supposed to increase counterclockwise. By defining four liquid crystal domains in each pixel region such that an angle formed between any two of the four directions is approximately equal to an integral multiple of 90 degrees (e.g., as the twelve o'clock direction, the nine o'clock direction, the six o'clock direction and the three o'clock direction, respectively), highly uniform viewing angle characteristic (such as the viewing angle dependence of the contrast ratio, among other things) and good display quality are realized. In a liquid crystal display device that has two subpixel regions in each pixel region, four liquid crystal domains are preferably provided for each of the two subpixel regions, i.e., eight liquid crystal domains in total are preferably provided for each pixel region. Also, in view of optical efficiency, the tilt direction of each liquid crystal domain is preferably defined so as to evenly split the axes of polarization (i.e., the transmission axes) of a pair of polarizers that are arranged as crossed Nicols. That is to say, the tilt direction of each liquid crystal domain is preferably defined so as to form an angle of approximately 45 degrees with respect to the axes of polarization of the pair of polarizers. To increase the uniformity of the viewing angle characteristic, the areas of those four liquid crystal domains in each pixel region are preferably equalized with each other. Specifically, the difference in area between the largest and smallest ones of the four liquid crystal domains is preferably equal to or smaller than 25% of the largest area. Furthermore, if a structure in which each pixel is divided into a number of subpixels is adopted to reduce the viewing angle dependence of the $\gamma$ characteristic, each of those subpixels that form each pixel preferably has four liquid crystal domains. The areas of those liquid crystal domains should naturally be defined to satisfy the relation described above in the entire pixel region. On top of that, in each of the subpixel regions, the four liquid crystal domains preferably have mutually equal areas. Even so, the difference in area between the largest and smallest ones of the four liquid crystal domains is preferably equal to or smaller than 25% of the largest area.

The vertical alignment liquid crystal layer of the preferred embodiment to be described below includes a nematic liquid crystal material with negative dielectric anisotropy. The pretilt directions defined by the two alignment films that sandwich the liquid crystal layer between them are different from each other by approximately 90 degrees. The tilt angle (i.e., the reference alignment direction) is defined as an intermediate direction between these two pretilt directions. No chiral agent is added to the liquid crystal layer. And when a voltage is applied to the liquid crystal layer, the liquid crystal molecules located near the alignment films will have a twisted alignment under the anchoring force of the alignment films. If necessary, a chiral agent may be added to the liquid crystal layer. By using such a pair of vertical alignment films defining two pretilt directions (alignment treatment directions) that are perpendicular to each other, the VA mode in which the liquid crystal molecules have a twisted alignment is sometimes called a vertical alignment twisted nematic (VATN) mode (see Patent Document No. 3, for example).

In the VATN mode, the pretilt angles defined by the two alignment films are preferably substantially equal to each other as disclosed by the applicant of the present application in Japanese Patent Application No. 2005-141846. By using such a pair of alignment films defining pretilt angles that are approximately equal to each other, the display luminance can be increased. Particularly when the difference between the pretilt angles defined by the two alignment films is within one degree, the tilt direction (i.e., the reference alignment direction) of liquid crystal molecules, located approximately at the middle of the thickness of the liquid crystal layer, can be controlled with good stability and the display luminance can be increased. This is probably because if the difference between the pretilt angles were more than one degree, then the tilt direction would vary noticeably from one location to another in the liquid crystal layer and the transmittance would vary significantly as a result (i.e., some area would have a lower transmittance than a desired one).

According to known methods, the pretilt direction of liquid crystal molecules may be defined by alignment films by subjecting the alignment films to a rubbing treatment or an optical alignment treatment, by forming a microstructure on an undercoat film for each alignment film and transferring the pattern of the microstructure onto the surface of the alignment film, or by evaporating obliquely an inorganic material such as SiO on an alignment film to define a microstructure thereon. Considering its mass productivity, either the rubbing treatment or the optical alignment treatment is preferred. Among other things, the optical alignment treatment is particularly preferred to increase the yield because that treatment is a non-contact method and generates no static electricity due to friction unlike the rubbing treatment. Also, as described in Japanese Patent Application No. 2005-141846 mentioned above, by using an optical alignment film including a photosensitive group, the variation in pretilt angle can be reduced to one degree or less. The optical alignment film preferably includes at least one photosensitive group selected from the group consisting of a 4-chalcone group, a 4'-chalcone group, a coumarin group, and a cinnamoyl group to name a few.

Multi-Domain Structure and Shielding Structure

The present inventors discovered that if such a multi-domain structure was formed in a vertical alignment liquid crystal layer using an alignment film, then misalignment unique to a VA mode liquid crystal display device occurred to have a harmful effect on the display quality. Such a misalignment is sensible as a region in which the transmittance of light becomes lower than a predetermined value when the screen is viewed straight, i.e., a region which looks darker compared to a region where the liquid crystal molecules are aligned in an ordinary way. That is why in view of the display luminance or contrast ratio when the screen is viewed straight, such a region does not have to be shielded from light. And if that region were shielded from light, then the display luminance or the contrast ratio would rather decrease. Nevertheless, as will be described later, as the presence of such a region would debase the display quality when the screen is viewed obliquely, that dark area should still be shielded from light when the viewing angle characteristic needs to be improved first and foremost.

Hereinafter, such a misalignment that would occur only in a VA mode liquid crystal display device with a multi-domain structure including an alignment film and a preferred shielding structure for shielding such a region with a misalignment from light will be described. In the following example, a structure with no multi-pixel structure, i.e., a situation where a single pixel region is defined for each pixel electrode, with be described for the sake of simplicity. The preferred embodiment to be described below is a TFT LCD as a typical example. However, the present invention is naturally applicable for use in a liquid crystal display device that adopts any other driving method.

First, misalignment that may occur in an electrode edge portion will be described.

The present inventors discovered that when a voltage was applied to a liquid crystal display device including a vertical alignment liquid crystal layer, of which the pretilt direction was controlled using an alignment film, to present a gray scale level thereon, an area, which looked darker than the gray scale level being presented when viewed straight, appeared inside of, and substantially parallel to, an edge portion of a pixel electrode. In the multi-domain structure, if at any of the edges of a pixel electrode, to which a liquid crystal domain is located close, the azimuthal direction that is perpendicular to the edge and that points toward the inside of the pixel electrode defines an angle greater than 90 degrees with respect to the tilt direction (i.e., the reference alignment direction) of the liquid crystal domain, the area that looks darker than the gray scale level being presented will appear inside of, and substantially parallel to, that edge. The alignment state of the liquid crystal molecules will be disturbed in that area probably because the tilt direction of the liquid crystal domain and the direction in which the anchoring force is produced by an oblique electric field at the edge of the pixel electrode have opposing components.

As used herein, the "gray scale level" refers to any level except black (i.e., the lowest level) and white (i.e., the highest level). The dark area always appears when a non-black gray scale level (including white) is presented as a matter of principle. However, the dark area is easier to perceive at a relatively high gray scale level. Also, unless a particular viewing direction is specified, the display state is always supposed to be a front viewing state (i.e., when the screen is viewed perpendicularly by a viewer located right in front of the screen).

Figure 1:
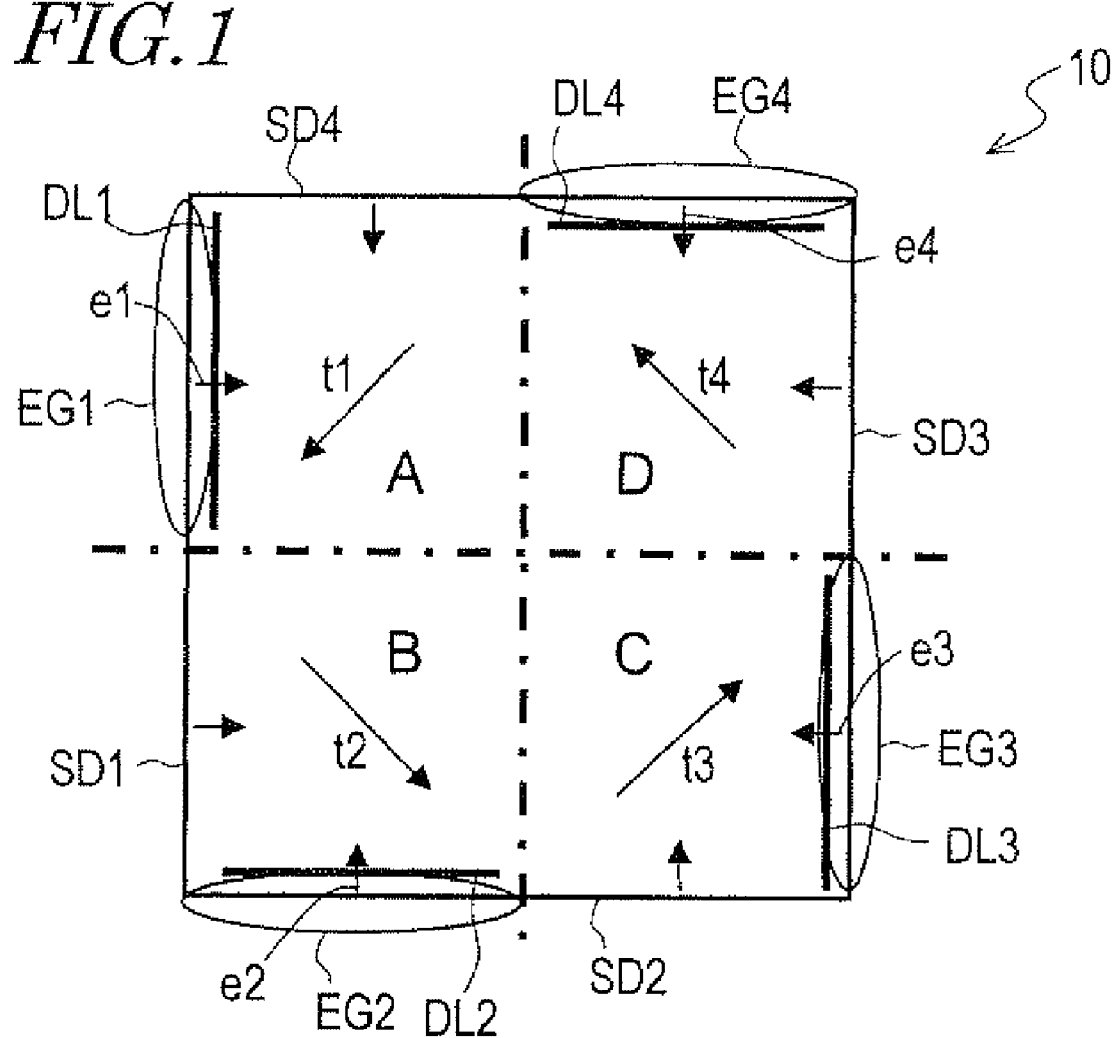
FIG. 1 illustrates an exemplary pixel region with a multi-domain structure in a VA mode liquid crystal display device according to the present invention.

The quadruple pixel region 10 shown in FIG. 1 will be described. FIG. 1 illustrates a pixel region 10 provided for a substantially square pixel electrode for the sake of simplicity. However, the present invention is in no way limited to any particular shape of a pixel region. Nevertheless, if pixels are arranged in columns and rows so as to form a matrix pattern, each pixel region normally has a rectangular shape, of which the ratio of its lengths in the row and column directions is one to three.

The pixel region 10 includes four liquid crystal domains A, B, C and D, of which the tilt directions (i.e., reference alignment directions) are identified by t1, t2, t3 and t4, respectively. These four tilt directions are defined such that an angle formed between any two of the four directions is approximately equal to an integral multiple of 90 degrees. This is an ideal quadruple structure to achieve the best viewing angle characteristic because the areas of these liquid crystal domains A, B, C and D are equal to each other. The four liquid crystal domains A, B, C and D are arranged in two columns and two rows to define a matrix pattern.

The pixel electrode has four edges (or sides) SD1, SD2, SD3 and SD4. An oblique electric field to be generated responsive to a voltage applied produces an anchoring force that has a component that is perpendicular to any of these sides and that points toward the inside of the pixel electrode (in an azimuthal direction). In the example shown in FIG. 1, the azimuthal directions that are perpendicular to the four edges SD1, SD2, SD3 and SD4 and that point toward the inside of the pixel electrode are identified by e1, e2, e3 and e4, respectively.

Each of the four liquid crystal domains is close to two out of the four edges of the pixel electrode. While a voltage is being applied thereto, each liquid crystal domain is subjected to the anchoring forces that have been produced at those edges by the oblique electric field.

In an edge portion EG1 of one edge of the pixel electrode, to which the liquid crystal domain A is located close, the azimuthal direction e1 that is perpendicular to the edge portion EG1 and that points toward the inside of the pixel electrode defines an angle greater than 90 degrees with respect to the tilt direction t1 of the liquid crystal domain, and misalignment occurs in that area. As a result, when a voltage is applied thereto, the liquid crystal domain A produces an area that looks darker than the other areas (which will be referred to herein as a "domain line DL1") parallel to this edge portion EG1. It should be noted that in this case, the two polarizers are arranged so as to face each other with the liquid crystal layer interposed between them and to have their transmission axes (polarization axes) crossed at right angles. That is to say, one of the two polarization axes is arranged horizontally and the other vertically. The transmission axes of the polarizers are supposed to be arranged in this manner unless otherwise stated.

In the same way, in an edge portion EG2 of one edge of the pixel electrode, to which the liquid crystal domain B is located close, the azimuthal direction e2 that is perpendicular to the edge portion EG2 and that points toward the inside of the pixel electrode defines an angle greater than 90 degrees with respect to the tilt direction t2 of the liquid crystal domain, and misalignment occurs in that area. As a result, when a voltage is applied thereto, the liquid crystal domain B may produce an area that looks darker than the other areas (which will be referred to herein as a "domain line DL2") parallel to this edge portion EG2.

In the same way, in an edge portion EG3 of one edge of the pixel electrode, to which the liquid crystal domain C is located close, the azimuthal direction e3 that is perpendicular to the edge portion EG3 and that points toward the inside of the pixel electrode defines an angle greater than 90 degrees with respect to the tilt direction t3 of the liquid crystal domain, and misalignment occurs in that area. As a result, when a voltage is applied thereto, the liquid crystal domain C may produce an area that looks darker than the other areas (which will be referred to herein as a "domain line DL3") parallel to this edge portion EG3.

In the same way, in an edge portion EG4 of one edge of the pixel electrode, to which the liquid crystal domain D is located close, the azimuthal direction e4 that is perpendicular to the edge portion EG4 and that points toward the inside of the pixel electrode defines an angle greater than 90 degrees with respect to the tilt direction t4 of the liquid crystal domain, and misalignment occurs in that area. As a result, when a voltage is applied thereto, the liquid crystal domain D may produce an area that looks darker than the other areas (which will be referred to herein as a "domain line DL4") parallel to this edge portion EG4.

If the horizontal direction on a display screen (i.e., the three o'clock direction) has an azimuthal angle of zero degrees, the tilt directions t1, t2, t3 and t4 are an approximately 225 degree direction (liquid crystal domain A), an approximately 315 degree direction (liquid crystal domain B), an approximately 45 degree direction (liquid crystal domain C) and an approximately 135 degree direction (liquid crystal domain D), respectively. The liquid crystal domains A, B, C and D are arranged such that the tilt directions of any two adjacent ones of the liquid crystal domains define an angle of approximately 90 degrees between them. The angle defined by any of the tilt directions t1, t2, t3 and t4 of the liquid crystal domains A, B, C and D with respect to an associated one of the azimuth angle components e1, e2, e3 and e4 of the anchoring forces produced by the oblique electric fields at the nearby edge portions EG1, EG2, EG3 and EG4 is approximately 135 degrees.

The dark areas (i.e., the domain lines DL1 through DL4) that are produced parallel to the edge portions EG1, EG2, EG3 and EG4, respectively, within the pixel region 10 deteriorate the viewing angle characteristic as will be described later. Thus, by providing shielding portions that can selectively shield at least respective parts of these edge portions EG1 through EG4 from incoming light, the deterioration of the viewing angle characteristic can be minimized.

As used herein, "to shield an edge portion from incoming light" means shielding not only the edge portion EG1, EG2, EG3 or EG4 but also its associated dark area (i.e., the domain line DL1, DL2, DL3 or DL4) produced near the edge portion in the pixel region from incoming light. The location of each domain line (i.e., the distance from its associated edge portion of the pixel electrode) is changeable with the dimensions of the pixel electrode, for example. Typically, however, the shielding portion may be arranged so as to shield a range that reaches approximately 10 μm to 20 μm from any edge portion of the pixel electrode from incoming light. Also, "a shielding portion for selectively shielding an area from incoming light" means that the shielding portion is provided to shield only that area selectively from incoming light. Nevertheless, there is no need to isolate such a shielding portion for selectively shielding an area from incoming light from the other shielding portions. To minimize the deterioration in viewing angle characteristic, the shielding portions are preferably arranged so as to shield all of the domain lines from incoming light. However, the presence of the shielding portions would decrease the optical efficiency (represented by the effective aperture ratio of a pixel). If a shielding portion that shields at least a part of an edge portion (including a domain line produced around there) from incoming light is provided, then the deterioration in viewing angle characteristic can be lightened at least to that degree. That is why the portions to shield from incoming light may be determined so as to strike an adequate balance between the required performance of the LCD and the optical efficiency to achieve.

Typically, a shielding portion is arranged so as to shield an edge portion and a domain line, which is produced near the edge portion in the pixel region, from incoming light. However, if the pixel aperture ratio should be given a higher priority than the viewing angle characteristic to strike a proper balance between them, only a part or all of the domain line may be shielded from incoming light without shielding the edge portion in order to reduce the area of the shielding portion. In most of the preferred embodiments to be described below, the edge portion and all of the domain line are supposed to be shielded from incoming light. However, in any of those preferred embodiments, the viewing angle characteristic can be improved by providing a shielding portion that selectively shields at least a portion of the domain line.

A method of dividing a pixel region into these four liquid crystal domains A through D (i.e., the arrangement of the liquid crystal domains in the pixel region) is not limited to the example illustrated in FIG. 1. Alternative alignment division methods (or alternative arrangements of: liquid crystal domains) will be described with reference to FIGS. 2 through 5.

Portion (a) of FIG. 2 shows a method of dividing the pixel region 10 shown in FIG. 1. More specifically, the pretilt directions PA1 and PA2 defined by the alignment film of a TFT substrate (i.e., the lower substrate), the pretilt directions PB1 and PB2 defined by the alignment film of a color filter (CF) substrate (i.e., the upper substrate), the tilt directions defined responsive to the application of a voltage to the liquid crystal layer, and areas that look dark due to misalignment (i.e., domain lines DL1 through DL4) are shown in portion (a) of FIG. 2. Those areas are not so-called "disclination lines". These drawings schematically indicate the orientation directions of liquid crystal molecules as viewed by the viewer and show that the liquid crystal molecules are tilted such that the elliptical end of each cylindrical liquid crystal molecule points toward the viewer.

By conducting an alignment treatment so as to achieve the alignment state shown in portion (a) of FIG. 2, the pixel region 10 can be defined. Specifically, the alignment treatment is conducted so as to divide the pixel region close to the TFT substrate into two and to define the pretilt directions PA1 and PA2 that are antiparallel to the vertical alignment film. In this preferred embodiment, an optical alignment treatment is carried out by irradiating the liquid crystal layer with an ultraviolet ray obliquely that has come from the direction pointed by the arrows. The alignment treatment is also conducted so as to divide the pixel region close to the CF substrate into two and to define the pretilt directions PB1 and PB2 that are antiparallel to the vertical alignment film. By bonding these substrates together, a multidomain structure can be defined in the pixel region 10. In the optical alignment treatment, the light does not have to come from the directions indicated above. Alternatively, the pixel region on the CF substrate may be irradiated with a light ray that has come from a direction that is tilted with respect to the vertical direction (i.e., the column direction) and the pixel region on the TFT substrate may be irradiated with a light ray that has come from a direction that is tilted with respect to the horizontal direction (i.e., the row direction).

As already described with reference to FIG. 1, the domain lines DL1, DL2, DL3 and DL4 are produced in the liquid crystal domains A, B, C and D parallel to the edge portions EG1, EG2, EG3 and EG4, respectively. The sum of the lengths of these four domain lines DL1 through DL4 will be an approximately half of the overall length of the four edges of the pixel electrode. The edge portions EG1 and EG3 (with the domain lines DL1 and DL3) are parallel to the vertical direction, while the edge portions EG2 and EG4 (with the domain lines DL2 and DL4) are parallel to the horizontal direction.

As shown in portion (a) of FIG. 2, a dark line is also observed in the boundary area of each of the liquid crystal domains A through D, which is adjacent to another one of the liquid crystal domains A through D, as indicated by the dashed line CL1. As will be described later, the crossed dark lines formed around the center of the pixel region are not always misalignment and do not have to be shielded on purpose. However, if a shielding member needs to be arranged within the pixel region, the shielding member is preferably arranged to hide these dark lines because the effective aperture ratio of the pixel (i.e., the optical efficiency) can be increased in that case.

Alternatively, by bonding together the TFT and CF substrates that have been subjected to the alignment treatment as shown in portion (b) of FIG. 2, a multi-domain structure can be defined for a pixel region 20. This pixel region 20 also includes four liquid crystal domains A, B, C and D. The tilt directions of the liquid crystal domains A through D are the same as those of the liquid crystal domains of the pixel region 10 shown in FIG. 1.

The domain lines DL1, DL2, DL3 and DL4 are produced in the liquid crystal domains A, B, C and D parallel to the edge portions EG1, EG2, EG3 and EG4, respectively. The sum of the lengths of these four domain lines DL1 through DL4 will be an approximately half of the overall length of the four edges of the pixel electrode. The edge portions EG1 and EG3 (with the domain lines DL1 and DL3) are parallel to the horizontal direction, while the edge portions EG2 and EG4 (with the domain lines DL2 and DL4) are parallel to the vertical direction. As shown in portion (b) of FIG. 2, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

Alternatively, by bonding together the TFT and CF substrates that have been subjected to the alignment treatment as shown in portion (a) of FIG. 3, a multi-domain structure can be defined for a pixel region 30. This pixel region 30 also includes four liquid crystal domains A, B, C and D. The tilt directions of the liquid crystal domains A through D are the same as those of the liquid crystal domains of the pixel region 10 shown in FIG. 1.

The tilt directions t1 and t3 of the liquid crystal domains A and C do not point toward any edge portions of the pixel electrode, and therefore, no domain lines are produced in these liquid crystal domains. On the other hand, the tilt directions t2 and t4 of the liquid crystal domains B and D point toward their associated edge portions of the pixel electrode and define an angle greater than 90 degrees with respect to azimuthal directions that are perpendicular to the edge portions and that point toward the inside of the pixel electrode. As a result, domain lines DL2 and DL4 are produced. Each of the domain lines DL2 and DL4 includes a portion (H) that is parallel to the horizontal direction and a portion (V) that is parallel to the vertical direction. That is to say, each of the tilt directions t2 and t4 defines an angle greater than 90 degrees with respect to both an azimuthal direction that is perpendicular to an edge portion of the horizontal edge and that points toward the inside of the pixel electrode and an azimuthal direction that is perpendicular to an edge portion of the vertical edge and that points toward the inside of the pixel electrode. Consequently, domain lines are produced in both of the two directions. As shown in portion (a) of FIG. 3, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

Alternatively, by bonding together the TFT and CF substrates that have been subjected to the alignment treatment as shown in portion (b) of FIG. 3, a multi domain structure can be defined for a pixel region 40. This pixel region 40 also includes four liquid crystal domains A, B, C and D. The tilt directions of the liquid crystal domains A through D are the same as those of the liquid crystal domains of the pixel region 10 shown in FIG. 1.

The tilt directions t1 and t3 of the liquid crystal domains A and C point toward their associated edge portions of the pixel electrode and define an angle greater than 90 degrees with respect to azimuthal directions that are perpendicular to the edge portions and that point toward the inside of the pixel electrode. As a result, domain lines DL1 and DL3 are produced. Each of the domain lines DL1 and DL3 includes a portion DL1(H) or DL3(H) that is parallel to the horizontal direction and a portion DL1(V) or DL3(V) that is parallel to the vertical direction. That is to say, each of the tilt directions t1 and t3 defines an angle greater than 90 degrees with respect to both an azimuthal direction that is perpendicular to an edge portion of the horizontal edge and that points toward the inside of the pixel electrode and an azimuthal direction that is perpendicular to an edge portion of the vertical edge and that points toward the inside of the pixel electrode. Consequently, domain lines are produced in both of the two directions. On the other hand, the tilt directions t2 and t4 of the liquid crystal domains B and D do not point toward any edge portions of the pixel electrode, and therefore, no domain lines are produced in these liquid crystal domains. As shown in portion (b) of FIG. 3, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

Four liquid crystal domains may be formed so as to have a different multi-domain structure from the ones shown in portions (a) and (b) of FIG. 2 or the ones shown in portions (a) and (b) of FIG. 3. However, one of the multi-domain structures shown in these drawings is still preferred for the following reasons. First of all, there are two regions in which each alignment slim is subjected to a predetermined alignment treatment. That is to say, by evenly splitting each alignment film into two portions and combining those two portions with each other, the liquid crystal layer can be divided into four portions. The number of divided portions to be subjected to the alignment treatment should not be increased because the throughput would decrease with the increased number of divided portions. Secondly, the boundary between the regions of each alignment film to be subjected to the alignment treatment is parallel to the pretilt direction defined by the alignment treatment. If the alignment treatment is performed in this manner (particularly when an optical alignment treatment is performed), the region to be produced near the boundary in which the pretilt direction cannot be defined to be the predetermined direction (i.e., a dead zone) can have a decreased width compared to a situation where the alignment treatment is performed so as to define the pretilt direction perpendicularly to the boundary.

Next, it will be described with reference to FIGS. 4 through 6 how domain lines are produced near the edge portions of a pixel electrode and how dark lines are produced (in the shape of a cross as shown in FIG. 2, for example) around the center of the pixel region. FIGS. 4 through 6 are cross-sectional views of a pixel region of a liquid crystal display device, showing the equipotential curve of an electric field created in the liquid crystal layer 3, the orientation directions of liquid crystal molecules 3a in the layer, and the relative (front) transmittance thereof, which were figured out by simulations.

This liquid crystal display device includes a TFT substrate 1 including a transparent substrate (e.g., a glass substrate) 1a and a pixel electrode 11 on the transparent substrate 1a, a CF substrate 2 including a transparent substrate (e.g. a glass substrate) 2a and a counter electrode 12 on the transparent substrate 2a, and a vertical alignment liquid crystal layer 3 interposed between the TFT and CF substrates 1 and 2. A vertical alignment film (not shown) is provided on each of the TFT and CF substrates 1 and 2 so as to contact with the liquid crystal layer 3. The liquid crystal layer is subjected to an alignment treatment so as to have the pretilt directions controlled as indicated by the arrows, arrowheads and arrow tails in the figures.

First, referring to FIG. 4, illustrated is a cross sectional view of the left half of the pixel region 20 shown in portion (b) of FIG. 2, including an edge portion of the liquid crystal domain D with the domain line DL4, as viewed on a plane defined by an azimuth angle of zero degrees. It can be seen that at an edge portion of the pixel electrode 11 shown in FIG. 4, liquid crystal molecules 3a (with a tilt angle of 135 degrees), located around the center of a plane of the liquid crystal domain and approximately at the middle of the thickness thereof, are gradually twisted toward the edge portion of the pixel electrode under the anchoring force (defined by an azimuthal direction of zero degrees) of an oblique electric field generated in the edge portion of the pixel electrode 11. In this examples the twist angle is 135 degrees, which is greater than 90 degrees. That is why due to a variation in retardation in this twisting region of the liquid crystal layer, the relative transmittance varies in a complicated manner as shown in FIG. 4, thereby producing a domain line in which the relative transmittance becomes local minimum within the pixel region (i.e., inside of the edge of the pixel electrode). That region with the local minimum transmittance as indicated by the dotted square in FIG. 4 corresponds to the domain line DL4 in the liquid crystal domain D shown in portion (b) of FIG. 2.

On the other hand, in another edge portion of the pixel electrode in which no domain line is produced as shown in FIG. 5, the twist angle of the liquid crystal molecules (i.e., the difference in tilt direction between the liquid crystal molecules located around the center of the liquid crystal domain and the liquid crystal molecules, of which the alignment is controlled by an oblique electric field that has been generated in the edge portion of the pixel electrode 11) is 90 degrees or less. And the relative transmittance decreases monotonically from the central portion of the pixel region toward the end thereof and reaches its local minimum outside of the pixel region (i.e., at the left end of FIG. 5), not inside of the pixel region. FIG. 5 is a cross-sectional view of the lower half of the pixel region 20 shown in portion (b) of FIG. 2, including another edge portion of the liquid crystal domain D without the domain line DL4, as viewed on a plane defined by an azimuth angle of 90 degrees.

Meanwhile, as shown in FIG. 6, the liquid crystal molecules also have a twist angle of 90 degrees or less in the boundary area in which two liquid crystal domains are adjacent to each other within the pixel region. Thus, the relative transmittance also changes simply and reaches a local minimum value there. FIG. 6 is a cross-sectional view of the liquid crystal domains D and A shown in portion (b) of FIG. 2, including the boundary area between them, as viewed on a plane defined by an azimuth angle of zero degrees.

FIG. 7 shows the distributions of transmission intensities in a situation where the pixel region 10 is viewed from the direction defined by an azimuth angle of 45 degrees. The four graphs of FIG. 7 show the distributions of transmission intensities on the four planes I, II, III and IV, respectively. Also, each of these graphs shows results in three viewing directions defined by polar angles of zero degrees (i.e., front direction), 45 degrees and 60 degrees, respectively.

It can be seen that in the domain lines appearing at the left end of Graph I, at the right end of Graph II, at the right end of Graph III, and at the left end of Graph IV, the behavior of the transmission intensity changes significantly according to the polar angle (particularly in Graph III). That is to say, the location with the minimum transmission intensity changes with the polar angle. For example, the transmission intensity in the front viewing direction (defined by a polar angle of zero degrees) is local minimum, whereas the transmission intensities at the polar angles of 45 and 60 degrees are local maximum. If the transmission intensity changes according to the polar angle in this manner, the viewing angle characteristic deteriorates. Among other things, the viewing angle dependence of γ characteristic deteriorates significantly to cause a phenomenon called "whitening".

By providing shielding portions that can selectively shield at least respective portions of the domain lines, produced in the edge portions of the pixel electrode, from incoming light, such deterioration in viewing angle characteristic can be reduced. Also, those domain lines are produced in the edge portions when the tilt directions of the liquid crystal molecules around the center of the liquid crystal layer are defined as described above with respect to the edges of the electrode. That is why the domain lines may also be produced in a normal pixel region with no multi-domain structures. For that reason, to minimize the deterioration in viewing angle characteristic due to the production of domain lines in the edge portions of the pixel electrode, such shielding portions for selectively shielding at least respective portions of the domain lines are preferably provided, no matter whether the multi-domain structure should be formed or not.

The dark lines formed around the center of the pixel region (e.g., crossed lines CL1) are not always misalignment and do not have to be shielded on purpose. However, if a shielding member needs to be arranged within the pixel region, the shielding member is preferably arranged to hide these dark lines because the effective aperture ratio of the pixel (i.e., the optical efficiency) can be increased in that case.

Hereinafter, a preferred example of the shielding structure will be described specifically.

In a TFT LCD, the substrate with pixel electrodes (and with multiple subpixel electrodes if the LCD has a multi-pixel structure) further includes gate bus lines, source bus lines, drain extension lines, and storage capacitor lines (which will also be referred to herein as "CS bus lines"). These lines are made of an opaque material, which is typically a metallic material. That is why the domain lines and the dark lines to be produced around the center are preferably shielded from light with some of those lines. If the lines have a multilayer structure, only some of multiple layers that form the lines may be used as well. For example, if at least a portion of a drain extension line, which is often arranged so as to cross the center of a pixel region vertically, is arranged so as to hide the dark lines to be produced around the center of a pixel region, then the effective aperture ratio of the pixel can be increased.

Also, if a configuration in which the storage capacitor electrode of a storage capacitor (CS, which includes the storage capacitor electrode, an insulating film (such as a gate insulating film) and a storage capacitor counter electrode) to be electrically connected in parallel to a liquid crystal capacitor (including a pixel electrode, a liquid crystal layer and a counter electrode) and the pixel electrode are arranged so as to use an extended portion of a CS bus line as the storage capacitor counter electrode is adopted, the area where the pixel electrode and the CS bus line extended portion overlap with each other (i.e., an area where the CS is formed) is preferably arranged so as to overlap with the domain lines. This is because the effective aperture ratio of a pixel (i.e., the optical efficiency) can be increased in that case.

The drain extension line and the CS bus line extended portion described above should always be provided, no matter whether they are arranged to shield the domain lines or the central dark area from incoming light or not. For that reason, by using those lines and portions as shielding portions as described above, not just can the effective aperture ratio of the pixel (i.e., optical efficiency) be increased but also can the viewing angle characteristic be improved as well.

Naturally, those shielding portions may be provided for not only the TFT substrate but also the counter substrate (i.e., a color filter substrate). Normally, parts of the black matrix on the counter substrate may be used as parts of the shielding portions.

Multi-Pixel Structure

Hereinafter, the multi-pixel structure of a liquid crystal display device as a preferred embodiment of the present invention will be described with reference to FIGS. 8(*a*) and 8(*b*).

A liquid crystal display device according to a preferred embodiment of the present invention has the multi pixel structure disclosed in Patent Document No. 1, the entire disclosure of which is hereby incorporated by reference. In FIG. 1 of Patent Document No. 1, the three subpixels 11*a*, 11*b* and 11*c* respectively correspond to three regions SPa, SPb2 and SPb1 in this description. Specifically, the region. SPa defines a bright subpixel, while the regions SPb1 and SPb2 define a dark subpixel. That is why the number of subpixels is supposed to be two in the following description. Each pixel region has a rectangular shape that is elongated in the column direction and the three regions thereof are arranged in the column direction.

FIGS. 8(*a*) and 8(*b*) also illustrate the multi-domain structures of the pixel region, in which the arrows indicate the tilt directions of the respective liquid crystal domains. Also, the domain lines to be produced at the edges of the pixel electrode and the dark lines to be produced around the center of the pixel region as described above are collectively shown as dark lines DL. FIG. 8(*a*) illustrates a multi-domain structure as a specific example of the present invention, while FIG. 8(*b*) illustrates a multi-domain structure as a comparative example.

The pixel region P of the liquid crystal display device of the specific example of the present invention shown in FIG. 8(*a*) has three regions SPa, SPb1 and SPb2. These three regions (which will also be referred to herein as first, second and third regions, respectively) are defined for the respective subpixel electrodes as will be described later by way of a specific example. Also, the first region SPa will be a bright subpixel, while the second and third regions SPb1 and SPb2 will be dark subpixel regions. That is to say, the first region SPa will be a subpixel that has a higher luminance than the one displayed by the pixel region P, while the second and third regions SPb1 and SPb2 will be subpixels that have a lower luminance than the one displayed by the pixel region P. The second and third regions SPb1 and SPb2 to be dark subpixels are arranged so as to interpose the region SPa to be a bright subpixel between them and are separated from each other. As disclosed in Patent Document No. 1, by arranging such bright and dark subpixels, unnaturalness can be eliminated and the γ characteristic can be further improved when an image with a linear boundary is presented.

As shown in FIG. 8(*a*), in the liquid crystal display device of this specific example, eight liquid crystal domains are defined in total within each pixel region P. And the four liquid crystal domains (e.g., the liquid crystal domains A through D described above, see FIG. 1) are provided for the bright subpixel SPa and another four liquid crystal domains are provided for the dark subpixels SPb1+SPb2. Two out of the four liquid crystal domains are arranged in each of the two dark subpixels SPb1 and SPb2.

On the other hand, in the liquid crystal display device of the comparative example, twelve liquid crystal domains are defined in total within each pixel region P' as shown in FIG. 8(b). That is to say, four liquid crystal domains (e.g., the liquid crystal domains A through D) are provided for each of the regions SPa', SPb1' and SPb2' corresponding to three subpixel electrodes.

As can be seen easily by comparing FIGS. 8(a) and 8(b) to each other, the total length of the dark lines DL produced within each pixel region is shorter in the pixel region P of the liquid crystal display device of this specific example than in the pixel region P' of the liquid crystal display device of the comparative example. Specifically, in the pixel region P of this specific example, no dark lines are produced so as to cross horizontally the centers of the second and third regions SPb1 and SPb2 that define the dark subpixels (i.e., parallel to the row direction. As a result, the pixel region P of this specific example comes to have a higher display luminance and lighter viewing angle dependence of the display quality than the pixel region P' of the comparative example. As for the effects of multidomain arrangement, although the dark subpixels are defined by the second and third regions SPb1 and SPb2 that are arranged separately from each other, the combination of these dark subpixels includes the liquid crystal domains A, B, C and D, thus achieving the same effect as the pixel region P' of the comparative example. That is to say, the subpixels may be arranged so that the preferred condition described above for achieving the effect of the multi-domain arrangement is satisfied by the combination of the dark subpixels (SPb1+SPb2).

In this preferred embodiment, a liquid crystal display device that has had its γ characteristic improved by adopting the multi-pixel structure has been described by way of an illustrative example. However, the effect caused by the short dark lines DL can still be achieved even when the two subpixels display the same luminance. In that case, those two subpixels are used as a redundant structure. That is to say, even if one of the two subpixels has caused a defect, the other subpixel still contributes to getting the display operation done. As a result, the yield of LCDs can be increased.

Furthermore, in the multi-domain structure of the pixel region P of this specific example shown in FIG. 8(a), attention should be paid to the fact that each of the two liquid crystal domains that each of the second and third regions SPb1 and SPb2 has is of the same type as an adjacent one of the four liquid crystal domains that the first region SPa has. That is to say, looking at a half of the pixel region P shown in FIG. 8(a) on either the right-hand side or the left-hand side, it can be seen that the two liquid crystal domains located over the centerline that splits this pixel region P into two vertically (i.e., in the column direction) are of the same type (i.e., liquid crystal domains A) and that the two liquid crystal domains located under that centerline are also of the same type (i.e., liquid crystal domains B). Such a multi-domain structure can not only simplify the alignment treatment process but also reduce the influence of misalignment on the display quality as well.

Next, the benefits of the multi-domain structure manufacturing process of the present invention will be described with reference to FIGS. 9A, 9B, 10A and 10B on the supposition that the multi-domain structure is formed by an optical alignment treatment.

FIGS. 9A and 9B illustrate how to make a mask alignment on an optical alignment film on a CF substrate during a photolithographic process to form the multi-domain structure of this specific example shown in FIG. 8(a). On the other hand, FIGS. 10A and 10B illustrate how to make a mask alignment on an optical alignment film on a CF substrate during a photolithographic process to form the multi-domain structure of the comparative example shown in FIG. 8(b). In these drawings, the region indicated by the dashed rectangle corresponds to the pixel region. Also, in these drawings, shown are the positions of the photomask during the two photolithographic processes that have already been described with reference to portion (a) of FIG. 2, and the double-headed arrows indicate the shielding portions of the photomask. Specifically, FIGS. 9A and 10A illustrate a situation where the pixel region is divided into three regions at an area ratio of 1 to 1 to 1, while FIGS. 9B and 10B illustrate a situation where the pixel region is divided into three regions at an area ratio of 1.5 to 1 to 1.5 (where the area of the first region for the bright subpixel SPa is supposed to be one). Also, the pixel structure in this example has the multi-pixel structure disclosed in Patent Document No. 1 as will be described later with reference to FIGS. 11 through 16 and includes electrically independent CS bus lines between the first and second regions SPa and SPb1 and between the first and second regions SPa and SPb2, respectively.

As can be seen from FIGS. 9A and 9B, if the multi-domain structure of this specific example shown in FIG. 8(a) is adopted, each unit region to be irradiated is approximately a half as long as the pixel (including respective halves of the widths of the upper and lower gate bus lines) as measured in the column direction, no matter whether the area division ratio is 1 to 1 to 1 or 1.5 to 1 to 1.5. That is why after the exposure has been done for the first time during the photolithographic process, the exposure may be performed once again for the second time with the photomask shifted (or translated) for a half of the length of one pixel in the column direction plus the width of the double exposure region. As a result, only one seam (i.e., the area exposed to the same radiation twice, which will be referred to herein as a "double exposure region") is left within the pixel region. Such a double exposure region is a region for leaving some margin for misalignment that will occur while the exposure process is performed with the photomask translated, and may have a width of approximately 2 to 3 μm. It should be noted that the double exposure region should be left rather than an unexposed region considering the reliability.

On the other hand, as can be seen from FIGS. 10A and 10B, if the multi-domain structure of the comparative example shown in FIG. 8(b) is adopted, five seams (or double exposure regions) will be left within the pixel region. Also, in a situation where the division ratio is 1 to 1 to 1, if the unit region to be irradiated is approximately a sixth as long as the pixel (including respective halves of the widths of the upper and lower gate bus lines) as measured in the column direction and if after the exposure has been performed for the first time, the exposure is performed for the second time with the photomask shifted (or translated) for approximately a sixth of the length of the pixel in the column direction plus the widths of the double-exposure regions, then regions with the predetermined pretilt direction and double exposure regions will be produced almost equally in each of the first, second and third regions SPa', SPb1' and SPb2' (see FIG. 10A). On the other hand, in a situation where the division ratio is 1.5 to 1 to 1.5, if after the exposure has been performed for the first time, the exposure is performed for the second time with the photomask shifted (or translated) for approximately 1/5.3 (where supposing the third region SPb2' has a reference length, ((1.5/2)/(1.5+1+1.5)≈1/5.3) of the length of the pixel in the column direction plus the widths of the double-exposure regions, then two aligned regions that are approximately 1/5.3 as long in the column direction as the pixel (i.e., regions that have been exposed only once) are produced in the third region SPb2' with one of the double exposure regions interposed between them. In the first and second regions SPa' and SPb1', however, the double exposure regions come to have a broadened width and unevenly aligned regions will be produced as a result of the second exposure.

As can be seen, since the multi-domain structure of the comparative example has a greater number of exposure seams, the ratio of the area in which the alignment control can be performed effectively (i.e., the ratio of the total area of the liquid crystal domains with a predetermined tilt direction to the overall area of the pixel region) decreases. On top of that, as the double exposure regions have a broadened width, the liquid crystal domains come to have different area ratios. If the multidomain structure of this specific example is adopted, however, these problems can be avoided, which is beneficial.

Next, a specific example of the pixel structure of a liquid crystal display device according to the present invention will be described with reference to FIGS. 11 through 16, which illustrate a planar layout for its TFT substrate. It should be noted that the multi-pixel structure of this preferred embodiment is basically disclosed in Patent Document No. 1.

FIGS. 11 through 14 illustrate two pixels that are adjacent to each other in the row direction among the multiple pixels that are arranged in columns and rows to form a matrix pattern. This liquid crystal display device is a so-called "dot-matrix-addressed" LCD in which voltages of mutually opposite polarities are applied to the respective portions of the liquid crystal layer of two pixels that are adjacent to each other in the row direction. FIG. 15 shows an equivalent circuit of a pixel located at the intersection between the $m^{th}$ row and the $n^{th}$ column in the pixel structure shown in FIGS. 11 through 14. And FIG. 16 shows the respective waveforms of a gate signal, a source signal (i.e., display signal), CS signals (representing storage capacitor counter voltages) and pixel voltages (i.e., the voltages applied to the liquid crystal capacitors of respective subpixels) in the liquid crystal display device with the pixel structure represented by the equivalent circuit diagram shown in FIG. 15.

First of all, the pixel structure will be described mainly in terms of its multi-domain structure and shielding structure with reference to FIGS. 11 through 14.

FIGS. 11 through 14 illustrate examples in which a bright subpixel (i.e. the first region SPa) is arranged at the center of each pixel region and dark subpixels (SPb1+SPb2) are arranged as two regions (i.e., the second and third regions SPb1 and SPb2) over and under that bright subpixel. Also, in the example illustrated in FIGS. 11 through 14, the combined area of the dark subpixels (SPb1+SPb2) is approximately three times as large as the area of the bright subpixel (SPa). Since the respective areas of the second and third regions SPb1 and SPb2 are defined to be equal to each other, the area of each of the second and third regions SPb1 and SPb2 is approximately 1.5 times as large as that of the first region SPa.

Hereinafter, the pixel structure will be described in detail with reference to FIG. 11, in which any common component also shown in FIGS. 12 to 14 is identified by the same reference numeral. And once a component has been described, the description of its counterpart will be omitted herein to avoid redundancies.

FIG. 11 illustrates two pixels that are located at the intersection between the $m^{th}$ row and the $n^{th}$ column and at the Intersection between the $m^{th}$ row and the $(n+1)^{th}$ column among multiple pixels that are arranged in columns and rows to form a matrix pattern. In this case, the $m^{th}$ row is a row of pixels, of which the ON and OFF states are controlled by TFTs 116 that are connected to the $m^{th}$ gate bus line 112(m), while the $n^{th}$ column is a column of pixels to be supplied with a source signal (i.e., a display signal) from the $n^{th}$ source bus line 114(n) by way of the TFTs 116. Between the first and second regions SPa and SPb1, arranged is a CS bus line 113o(m) to make the first region SPa a bright subpixel. On the other hand, between the first and third regions SPa and SPb2, arranged is a CS bus line 113e(m) to make the second and third regions SPb1 and SPb2 dark subpixels.

Three TFTs 116 are provided for each pixel. One of those three TFTs 116 has its drain electrically connected through a drain extension line 117a to a first subpixel electrode 111a, which defined the first region SPa, at a contact portion 119a. The two other TFTs 116 have their drains electrically connected through a drain extension line 117b to second and third subpixel electrodes 111b1 and 111b2, which define the second and third regions SPb1 and SPb2, at contact portions 119b1 and 119b2, respectively.

Each of the bright subpixel region (i.e., the first region SPa) and the dark subpixel regions (i.e., the second and third regions SPb1 and SPb2) of the pixel region shown in FIG. 11 has the multi-domain structure shown in portion (a) of FIG. 2. Thus, as already described with reference to portion (a) of FIG. 2, domain lines DL1, DL2, DL3 and DL4 are produced in the liquid crystal domains A, B, C and D parallel to the edge portions EG1, EG2, EG3 and EG4, respectively. In addition, a dark line is also produced in the boundary between each of the liquid crystal domains A through D and an adjacent one of the three others. As in the example that has already been described with reference to FIG. 8, the domain lines produced in the edge portions of the pixel electrode and the dark lines produced around the center of the pixel region will also be referred to herein as "dark lines DL" collectively.

In the pixel region shown in FIG. 11, the dark lines DL are not shielded entirely but only selectively. Part of the drain extension line 117b forms a central shielding portion that selectively shields a portion of the dark line DL to be produced around the respective centers of the first, second and third regions SPa, SPb1 and SPb2 (i.e., a portion that extends in the column direction). Another part of the drain extension line 117b forms an edge shielding portion for shielding a portion of the dark line DL to be produced in the liquid crystal domain D of the second region SPb1.

Look at the pixel (m, n), and it can be seen that part of the drain extension line 117a forms an edge shielding portion for shielding a portion of the dark line DL to be produced in the liquid crystal domain B of the first region SPa. It can also be seen that the CS bus line 113o has an extended portion 113a that sticks out into the first region SPa and that forms an edge shielding portion for shielding a portion of the dark line DL to be produced in the liquid crystal domain A. Likewise, the CS bus line 113e has an extended portion 113b2 that sticks out into the third region SPb2 and that forms an edge shielding portion for shielding a portion of the dark line DL to be produced in the liquid crystal domain C.

Next, look at the pixel (m, n+1), and it can be seen that part of the drain extension line 117a forms an edge shielding portion for shielding a portion of the dark line DL to be produced in the liquid crystal domain C of the third region SPb2. It can also be seen that the CS bus line 113e has an extended portion 113a that sticks out into the first region SPa and that forms an edge shielding portion for shielding a portion of the dark line DL to be produced in the liquid crystal domain C. Likewise, the CS bus line 113o has an extended portion 113b1 that sticks out into the second region SPb1 and that forms an edge shielding portion for shielding a portion of the dark line DL to be produced in the liquid crystal domain A.

Looking at the extended portions 113a, 113b1 and 113b2 of the CS bus lines 113o and 113e that form the shielding portions, it can be seen that these extended portions 113a, 113b1 and 113b2 are arranged symmetrically with respect to the center of the two pixel regions that are adjacent to each other in the row direction as shown in FIG. 11. This arrangement is adopted for the following reasons. Specifically, the liquid crystal display device of this example is a so-called "dot inversion addressed" LCD in which voltages of mutually opposite polarities are applied to respective portions of the liquid crystal layer of the pixels that are adjacent to each other in the row direction. The multi-pixel structure disclosed in Patent Document No. 1 is applied to such an LCD. And the extended portions 113a, 113b1 and 113b2 of the CS bus lines 113o and 113e function as not only shielding portions but also storage capacitors.

Specifically, as for the bright subpixel (SPa) of the pixel (m, n), part of the extended portion 113a of the CS bus line 113o that overlaps with the subpixel electrode 111a forms a storage capacitor (CcsO shown in FIG. 15). On the other hand, as for the dark subpixels (SPb1+SPb2) of the pixel (m, n), part of the extended portion 113b2 of the CS bus line 113e that overlaps with the subpixel electrode 111b2 forms a storage capacitor (CcsE shown in FIG. 15). Meanwhile, as for the bright subpixel (SPa) of the pixel (m, n+1), part of the extended portion 113a of the CS bus line 113e that overlaps with the subpixel electrode 111a forms a storage capacitor. On the other hand, as for the dark subpixels (SPb1+SPb2) of the pixel (m, n+1) part of the extended portion 113b1 of the CS bus line 113o that overlaps with the subpixel electrode 111b1 forms a storage capacitor. In a vertical scanning period (which is typically a frame) in which data is written on the pixel (m, n) with a positive (+) voltage (i.e., the polarity of the signal voltage supplied through the source bus line 114(n) is positive with respect to the counter voltage), to make the first region SPa a bright subpixel, the CS signal supplied through the CS bus line 113o needs to have such a waveform that the first change of its amplitudes after the TFT 116(m, n) has been turned OFF is increase. On the other hand, to make the second and third regions SPb1 and SPb2 dark subpixels, the CS signal supplied through the CS bus line 113o needs to have such a waveform that the first change of its amplitudes after the TFT 116(m, n) has been turned OFF is decrease (see FIG. 16). In this vertical scanning period, data is written on the pixel (m, n+1) with a negative (−) voltage (i.e., the polarity of the signal voltage supplied through the source bus line 114(n+1) is negative with respect to the counter voltage). That is why to make the first region SPa a bright subpixel, the CS signal supplied through the CS bus line 113e needs to have such a waveform that the first change of its amplitudes after the TFT 116(m, n+1) has been turned OFF is decrease. On the other hand, to make the second and third regions SPb1 and SPb2 dark subpixels, the CS signal supplied through the CS bus line 113o needs to have such a waveform that the first change of its amplitudes after the TFT 116(m, n+1) has been turned OFF is increase. As can be seen from FIG. 11, by arranging the extended portions 113a, 113b1 and 113b2 of the CS bus lines 113o and 113e, which function as not only shielding portions but also storage capacitors, symmetrically with respect to the center of the two pixel regions that are adjacent to each other in the row direction, the relation described above is satisfied.

Naturally, the shielding portions do not have to be arranged just as described above. Alternatively, part of the gate bus line, source bus line, drain extension line or CS bus line may be used instead. Still alternatively, the black matrix layer of the CF substrate, which is arranged so as to face the TFT substrate, may also be used. Or those portions may be appropriately combined with each other to shield the non-shielded portions in FIG. 11 from incoming light, too.

Hereinafter, the cross-sectional structure of the TFT substrate shown in FIG. 11 will be described briefly. For example, the gate bus lines 112 and CS bus lines 114 are arranged on a glass substrate by patterning the same conductor layer (which is typically a single metal layer but could also have a multilayer structure). And a gate insulating film (not shown) has been deposited so as to cover those lines. A semiconductor layer (not shown) that forms part of the TFTs 116 has been stacked on the gate insulating film. And the source bus lines 114 and drain extension lines 117a and 117b are arranged so as to be electrically connected to the source and drain of the TFTs 116. Furthermore, an Interlayer dielectric film (not shown) has been deposited over these lines and elements. And the subpixel electrodes 111a, 111b1 and 111b2 are arranged on the interlayer dielectric film and are electrically connected to the drain extension line 117a or 117b inside the contact holes (not shown but corresponding to the contact hole portions 119a, 119b1 and 119b2) that have been cut through the interlayer dielectric film. A storage capacitor may be formed of an extended portion of a CS bus line, a subpixel electrode and portions of the gate insulating film and interlayer dielectric film between them. Naturally, the storage capacitor may also be formed by overlapping the CS bus line itself with the subpixel electrode. The extended portion of the CS bus line can also shield the electric lines of force produced between the source bus line and the subpixel electrode with the potential applied to the extended portion of the CS bus line, thus achieving the effect of reducing the parasitic capacitance between the source bus line and the subpixel electrode, too.

The multi-domain structures shown in FIGS. 12 to 14 are different from that of the liquid crystal display device shown in FIG. 11. That is why in FIGS. 12 to 14, the dark lines DL are produced in different locations of the edge portions, and therefore, different shielding structures are used. However, even in the pixel structures shown in FIGS. 12 to 14, the equivalent circuit of the pixel located at the intersection between the $m^{th}$ row and the $n^{th}$ column is the same as the one shown in FIG. 15. And these structures are also driven with the respective signals shown in FIG. 16. Thus, the following description will be focused on the difference between the multi-domain structures with different shielding structures.

Each of the bright subpixel region (i.e., the first region SPa) and the dark subpixel regions (i.e., the second and third regions SPb1 and SPb2) of the pixel region shown in FIG. 12 has the multi-domain structure shown in portion (b) of FIG. 2. Thus, as already described with reference to portion (b) of FIG. 2, domain lines DL1, DL2, DL3 and DL4 are produced in the liquid crystal domains A, B, C and D parallel to the edge portions EG1, EG2, EG3 and EG4, respectively. The sum of the lengths of these four domain lines DL1 through DL4 will be an approximately half of the overall length of the four edges of the pixel electrode. The edge portions EG1 and EG3 (with the domain lines DL1 and DL3) are parallel to the horizontal direction, while the edge portions EG2 and EG4

(with the domain lines DL2 and DL4) are parallel to the vertical direction. As shown in portion (b) of FIG. 2, a dark line is also observed in the boundary area of each of the liquid crystal domains A through D, which is adjacent to another one of the liquid crystal domains A through D, as indicated by the dashed line CL1. The crossed dark lines are formed around the center of the pixel region. As in the example that has already been described with reference to FIG. 8, the domain lines produced in the edge portions of the pixel electrode and the dark lines produced around the center of the pixel region will also be referred to herein as "dark lines DL" collectively.

In the pixel region shown in FIG. 12, the dark lines DL are not shielded entirely but only selectively. Part of the drain extension line 117b forms a central shielding portion that selectively shields a portion of the dark line DL to be produced around the respective centers of the first, second and third regions SPa, SPb1 and SPb2 (i.e., a portion that extends in the column direction). Another part of the drain extension line 117b forms an edge shielding portion for shielding a portion of the dark line DL to be produced in the liquid crystal domain C of the second region SPb1.

Look at the pixel (m, n), and it can be seen that part of the drain extension line 117a forms an edge shielding portion for shielding a portion of the dark line DL to be produced in the liquid crystal domain A of the first region SPa and an edge shielding portion for shielding a portion of the dark line DL to be produced in the liquid crystal domain A of the third region SPb2. It can also be seen that the CS bus line 113o has an extended portion 113a that sticks out into the first region SPa and that forms an edge shielding portion for shielding a portion of the dark line DL to be produced in the liquid crystal domain B. Likewise, the CS bus line 113e has an extended portion 113b2 that sticks out into the third region SPb2 and that forms an edge shielding portion for shielding a portion of the dark line DL to be produced in the liquid crystal domain D.

Next, look at the pixel (m, n+1), and it can be seen that part of the drain extension line 117a forms an edge shielding portion for shielding a portion of the dark line DL to be produced in the liquid crystal domain D of the third region SPb2. It can also be seen that the CS bus line 113e has an extended portion 113a that sticks out into the first region SPa and that forms an edge shielding portion for shielding a portion of the dark line DL to be produced in the liquid crystal domain D. Likewise, the CS bus line 113o has an extended portion 113b1 that sticks out into the second region SPb1 and that forms an edge shielding portion for shielding a portion of the dark line DL to be produced in the liquid crystal domain B.

Looking at the extended portions 113a, 113b1 and 113b2 of the CS bus lines 113o and 113e that form the shielding portions, it can be seen that these extended portions 113a, 113b1 and 113b2 are arranged symmetrically with respect to the center of the two pixel regions that are adjacent to each other in the row direction as shown in FIG. 11.

Each of the bright subpixel region (i.e., the first region SPa) and the dark subpixel regions (i.e., the second and third regions SPb1 and SPb2) of the pixel region shown in FIG. 13 has the multi-domain structure shown in portion (a) of FIG. 3. Thus, as already described with reference to portion (a) of FIG. 3, the tilt directions t1 and t3 of the liquid crystal domains A and C do not point toward any edge portions of the pixel electrode, and therefore, no domain lines are produced in these liquid crystal domains. On the other hand, the tilt directions t2 and t4 of the liquid crystal domains B and D point toward their associated edge portions of the pixel electrode and define an angle greater than 90 degrees with respect to azimuthal directions that are perpendicular to the edge portions and that point toward the inside of the pixel electrode. As a result, domain lines DL2 and DL4 are produced. Each of the domain lines DL2 and DL4 includes a portion (H) that is parallel to the horizontal direction and a portion (V) that is parallel to the vertical direction. That is to say, each of the tilt directions t2 and t4 defines an angle greater than 90 degrees with respect to both an azimuthal direction that is perpendicular to an edge portion of the horizontal edge and that points toward the inside of the pixel electrode and an azimuthal direction that is perpendicular to an edge portion of the vertical edge and that points toward the inside of the pixel electrode. Consequently, domain lines are produced in both of the two directions. As shown in portion (a) of FIG. 3, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region. As in the example that has already been described with reference to FIG. 8, the domain lines produced in the edge portions of the pixel electrode and the dark lines produced around the center of the pixel region will also be referred to herein as "dark lines DL" collectively.

In the pixel region shown in FIG. 13, the dark lines DL are not shielded entirely but only selectively. Part of the drain extension line 117b forms a central shielding portion that selectively shields a portion of the dark line DL to be produced around the respective centers of the first, second and third regions SPa, SPb1 and SPb2 (i.e., a portion that extends in the column direction). Another part of the drain extension line 117b forms an edge shielding portion for shielding a portion of the dark line DL to be produced in the liquid crystal domain D of the second region SPb1.

Look at the pixel (m, n), and it can be seen that part of the drain extension line 117a forms an edge shielding portion for shielding a portion of the dark line DL to be produced in the liquid crystal domain B of the first region SPa and an edge shielding portion for shielding a portion of the dark line DL to be produced in the liquid crystal domain B of the third region SPb2. It can also be seen that the CS bus line 113o has an extended portion 113a that sticks out into the first region SPa and that forms an edge shielding portion for shielding a portion of the dark line DL to be produced in the liquid crystal domain D. Likewise, the CS bus line 113e has an extended portion 113b2 that sticks out into the third region SPb2 and that forms an edge shielding portion for shielding a portion of the dark line DL to be produced in the liquid crystal domain B.

Next, look at the pixel (m, n+1), and it can be seen that part of the drain extension line 117a forms an edge shielding portion for shielding a portion of the dark line DL to be produced in the liquid crystal domain B of the third region SPb2. It can also be seen that the CS bus line 113e has an extended portion 113a that sticks out into the first region SPa and that forms an edge shielding portion for shielding a portion of the dark line DL to be produced in the liquid crystal domain B. Likewise, the CS bus line 113o has an extended portion 113b1 that sticks out into the second region SPb1 and that forms an edge shielding portion for shielding a portion of the dark line DL to be produced in the liquid crystal domain D.

Looking at the extended portions 113a, 113b1 and 113b2 of the CS bus lines 113o and 113e that form the shielding portions, it can be seen that these extended portions 113a, 113b1 and 113b2 are arranged symmetrically with respect to the center of the two pixel regions that are adjacent to each other in the row direction as shown in FIG. 11.

Each of the bright subpixel region (i.e., the first region SPa) and the dark subpixel regions (i.e. the second and third regions SPb1 and SPb2) of the pixel region shown in FIG. 14 has the multi-domain structure shown in portion (b) of FIG. 3. Thus, as already described with reference to portion (b) of FIG. 3, the tilt directions t1 and t3 of the liquid crystal domains A and C point toward their associated edge portions of the pixel electrode and define an angle greater than 90 degrees with respect to azimuthal directions that are perpendicular to the edge portions and that point toward the inside of the pixel electrode. As a result, domain lines DL1 and DL3 are produced. Each of the domain lines DL1 and DL3 includes a portion DL1(H) or DL3(H) that is parallel to the horizontal direction and a portion DL1(V) or DL3(V) that is parallel to the vertical direction. That is to say, each of the tilt directions t1 and t3 defines an angle greater than 90 degrees with respect to both an azimuthal direction that is perpendicular to an edge portion of the horizontal edge and that points toward the inside of the pixel electrode and an azimuthal direction that is perpendicular to an edge portion of the vertical edge and that points toward the inside of the pixel electrode. Consequently, domain lines are produced in both of the two directions. On the other hand, the tilt directions t2 and t4 of the liquid crystal domains B and D do not point toward any edge portions of the pixel electrode, and therefore, no domain lines are produced in these liquid crystal domains. As shown in portion (b) of FIG. 3, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region. As in the example that has already been described with reference to FIG. 8, the domain lines produced in the edge portions of the pixel electrode and the dark lines produced around the center of the pixel region will also be referred to herein as "dark lines DL" collectively.

In the pixel region shown in FIG. 14, the dark lines DL are not shielded entirely but only selectively. Part of the drain extension line 117b forms a central shielding portion that selectively shields a portion of the dark line DL to be produced around the respective centers of the first, second and third regions SPa, SPb1 and SPb2 (i.e., a portion that extends in the column direction). Another part of the drain extension line 117b forms an edge shielding portion for shielding a portion of the dark line DL to be produced in the liquid crystal domain C of the second region SPb1.

Look at the pixel (m, n), and it can be seen that part of the drain extension line 117a forms an edge shielding portion for shielding a portion of the dark line DL to be produced in the liquid crystal domain A of the first region SPa and an edge shielding portion for shielding a portion of the dark line DL to be produced in the liquid crystal domain A of the third region SPb2. It can also be seen that the CS bus line 113o has an extended portion 113a that sticks out into the first region SPa and that forms an edge shielding portion for shielding a portion of the dark line DL to be produced in the liquid crystal domain C. Likewise, the CS bus line 113e has an extended portion 113b2 that sticks out into the third region SPb2 and that forms an edge shielding portion for shielding a portion of the dark line DL to be produced in the liquid crystal domain A.

Next, look at the pixel (m, n+1), and it can be seen that part of the drain extension line 117a forms an edge shielding portion for shielding a portion of the dark line DL to be produced in the liquid crystal domain A of the third region SPb2. It can also be seen that the CS bus line 113e has an extended portion 113a that sticks out into the first region SPa and that forms an edge shielding portion for shielding a portion of the dark line DL to be produced in the liquid crystal domain A. Likewise, the CS bus line 113o has an extended portion 113b1 that sticks out into the second region SPb1 and that forms an edge shielding portion for shielding a portion of the dark line DL to be produced in the liquid crystal domain C.

Looking at the extended portions 113a, 113b1 and 113b2 of the CS bus lines 113o and 113e that form the shielding portions, it can be seen that these extended portions 113a, 113b1 and 113b2 are arranged symmetrically with respect to the center of the two pixel regions that are adjacent to each other in the row direction as shown in FIG. 11.

As already described with reference to FIG. 11, the shielding portions do not have to be arranged just as described above in any of the pixel structures shown in FIGS. 12 to 14. Alternatively, part of the gate bus line, source bus line, drain extension line or CS bus line may be used instead. Still alternatively, the black matrix layer of the CF substrate, which is arranged so as to face the TFT substrate, may also be used. Or those portions may be appropriately combined with each other to shield the non-shielded portions in FIG. 12, 13 or 14 from incoming light, too.

Hereinafter, it will be described briefly with reference to FIGS. 15 and 16 how to drive a liquid crystal display device with the multi-pixel structure shown in any of FIGS. 11 to 14.

The pixel located at the intersection between the $m^{th}$ row and the $n^{th}$ column is represented by the equivalent circuit diagram shown in FIG. 15.

This pixel region includes a subpixel electrode 111a, a second subpixel electrode 111b1 and a third subpixel electrode 111b2, which define the first, second and third regions SPa, SPb1 and SPb2, respectively. The first region SPa defines a bright subpixel, while the second and third regions SPb1 and SPb2 define dark subpixels.

The first subpixel electrode 111a is connected to the drain of a transistor 116a through the drain extension line 117a. On the other hand, the second and third subpixel electrodes 111b1 and 111b2 are connected to the respective drains of the transistors 116b and 116c through the dram extension line 117b. The respective sources of the TFTs 116a, 116b and 116c are connected no a source bus line 114n and their gates are connected to a gate bus line 112(m). Consequently, the ON and OFF states of these TPTs 116a, 116b and 116c are controlled with the same gate signal. And the same source signal voltage (i.e., display signal voltage) is applied to the first, second and third subpixel electrodes 111a, 111b1 and 111b2 through the same source bus line.

The first subpixel electrode 111a, the liquid crystal layer, and a counter electrode 121, which is arranged on one side of the other substrate with the liquid crystal layer so that the counter substrate faces the substrate of the first subpixel electrode 111a through the liquid crystal layer, together form a liquid crystal capacitor ClcO (to be a bright subpixel). A storage capacitor CcsO is electrically connected in parallel to this liquid crystal capacitor ClcO. One of the two electrodes that form the storage capacitor CcsO is the first subpixel electrode 111a, while the other electrode is the extended portion 113a of the CS bus line 113o. In the same way, the second subpixel electrode 111b1, the liquid crystal layer, and the counter electrode 121 together form a liquid crystal capacitor ClcE1 (to be a part of a dark subpixel). And the third subpixel electrode 111b2, the liquid crystal layer, and the counter electrode 121 together form a liquid crystal capacitor ClcE2 (to be another part of the dark subpixel). A storage capacitor CcsE is electrically connected in parallel to these liquid crystal capacitors ClcE1 and ClcE2. One of the two electrodes that form the storage capacitor CcsE is the third subpixel electrode 111$b$2, while the other electrode is the extended portion 113$b$2 of the CS bus line 113$e$. Consequently, the second and third subpixel electrodes 111$b$1 and 111$b$2 come to have an equal potential.

Next, it will be described with reference to FIG. 16 how the liquid crystal capacitor ClcO becomes a bright subpixel and how the liquid crystal capacitors ClcE1 and ClcE2 become dark subpixels. FIG. 16 shows the waveforms of the gate signal Vg, the source signal (display signal) Vs, the CS signals (representing storage capacitor counter voltages) VcsO and VcsE, and the pixel voltages (i.e., the voltage VlcO applied to the liquid crystal capacitor ClcO and the voltage VlcE applied to the liquid crystal capacitors ClcE1 and ClcE2).

First of all, at a time T0 of the vertical scanning period of the $n^{th}$ frame, the voltages VcsO and VcsE are set to be VcsO=Vcom−Vad and VcsE=Vcom+Vad, respectively, where Vcom represents the voltage at the counter electrode and Vad represents the variation in the amplitude of the CS voltage (which is a half of the maximum amplitude).

Next, at a time T1, Vg rises from VgL to VgH to turn the respective TFTs ON. As a result, Vlc1 and Vlc2 rise to Vsp, thereby charging the liquid crystal capacitors ClcO, ClcE1, and ClcE2 and the storage capacitors CcsO and CcsE.

Then, at a time T2, Vg falls from VgH to VgL to turn the respective TETs OFF. As a result, the liquid crystal capacitors ClcO, ClcE1, and ClcE2 and the storage capacitors CcsO and CcsE get electrically isolated from the source bus line. Meanwhile, just after the TFTs have been turned OFF, a feedthrough phenomenon occurs due to the influence of the parasitic capacitor, thus making VlcO=Vsp−Vd1 and VlcE=Vsp−Vd2, where Vd1 and Vd2 represent the amplitudes of feedthrough voltages.

Subsequently, at a time T3, VcsO rises from Vcom−Vad to Vcom+Vad. And then at a time T4 (which may be 1H (horizontal scanning period) later than T3), VcsE falls from Vcom+Vad to Vcom−Vad.

As a result, VlcO=Vsp−Vd1+2×K×Vad and VlcE=Vsp−Vd2−2×K×Vad, where K=Ccs/(Clc+Ccs), Ccs is the capacitance value of the respective storage capacitors CcsO and CcsE and Clc is the capacitance value of the respective liquid crystal capacitors Clc and ClcE1+ClcE2.

Consequently, the effective voltages VlcO and VlcE applied to the respective subpixel capacitors (i.e., the liquid crystal capacitor ClcO and the liquid crystal capacitors ClcE1 and ClcE2) in the $n^{th}$ frame become V1=Vsp−Vd1+2×K×Vad−Vcom and V2=Vsp−Vd2−2×K×Vad−Vcom. In this manner, within a single pixel region, the liquid crystal capacitor ClcO forms a bright subpixel (as the first region SPa) and the liquid crystal capacitors ClcE1 and ClcE2 form dark subpixels (as the second and third regions SPb1 and SPb2).

By controlling the waveform of the CS signal supplied to the CS bus line such that the waveform of the CS signal changes only once in a frame as described above, the influence of the waveform blunting of the signal applied to the CS bus line on the drain effective potential can be reduced. Thus, this method can be used effectively to reduce the unevenness of luminance due to such waveform blurting. It should be noted that the CS signal waveform is not limited to the example described above. Alternatively, a rectangular wave with a duty ratio of 1 to 1 or any of various other waveforms could be used as well.

INDUSTRIAL APPLICABILITY

The liquid crystal display device of the present invention can be used effectively in TVs and other applications that require a wide viewing angle characteristic.

The invention claimed is:
1. A liquid crystal display device comprising multiple pixel regions that are arranged in columns and rows to form a matrix pattern,
wherein each said pixel region includes: a vertical alignment liquid crystal layer; first and second substrates, which face each other with the liquid crystal layer interposed between them; first, second and third subpixel electrodes, which are arranged on one side of the first substrate facing the liquid crystal layer; a counter electrode, which is arranged on one side of the second substrate facing the liquid crystal layer to oppose the first, second and third subpixel electrodes; and at least one alignment film, which is arranged in contact with the liquid crystal layer and defines pretilt directions, the first subpixel electrode being interposed between the second and third subpixel electrodes as viewed from a normal direction of the first substrate, and
wherein each said pixel region is comprised of first, second and third regions associated with the first, second and third subpixel electrodes, respectively, and
wherein each said pixel region includes eight liquid crystal domains in total, consisting of two sets of four liquid crystal domains of first, second, third and fourth types, in which liquid crystal molecules are tilted in first, second, third and fourth directions, respectively, around the center of a plane, and approximately at the middle of the thickness, of the liquid crystal layer in response to a voltage applied, the first, second, third and fourth directions being defined by the pretilt directions such that an angle formed between any two of the four directions is approximately equal to an integral multiple of 90 degrees, and
wherein the first region has four liquid crystal domains of the first, second, third and fourth types, respectively, and
wherein in the first region, the liquid crystal domain of the first type is located close to at least a part of an edge of the first subpixel electrode, the part including a first edge portion in which an azimuthal direction that is perpendicular to the part and that points toward the inside of the first subpixel electrode defines an angle greater than 90 degrees with respect to the first direction, and
the liquid crystal domain of the second type is located close to at least a part of another edge of the first subpixel electrode, the part including a second edge portion in which an azimuthal direction that is perpendicular to the part and that points toward the inside of the first subpixel electrode defines an angle greater than 90 degrees with respect to the second direction,
the liquid crystal domain of the third type is located close to at least a part of another edge of the first subpixel electrode, the part including a third edge portion in which an azimuthal direction that is perpendicular to the part and that points toward the inside of the first electrode defines an angle greater than 90 degrees with respect to the third direction,
the liquid crystal domain of the fourth type is located close to at least a part of another edge of the first subpixel electrode, the part including a fourth edge portion in which an azimuthal direction that is perpendicular to the part and that points toward the inside of the first subpixel electrode defines an angle greater than 90 degrees with respect to the fourth direction, and wherein each of the second and third regions has two liquid crystal domains selected from the four other liquid crystal domains of the first, second, third and fourth types.

2. The liquid crystal display device of claim 1, wherein each of the two liquid crystal domains that each of the second and third regions has is of the same type as an adjacent one of the four liquid crystal domains that the first region has.

3. The liquid crystal display device of claim 1, wherein in each of the first, second and third regions, each pair of adjacent liquid crystal domains have tilt directions that are different from each other by approximately 90 degrees.

4. The liquid crystal display device of claim 1, wherein in each said pixel region, the combined area of the two liquid crystal domains of one of the first, second, third and fourth types is equal to that of the two liquid crystal domains of any of the three other types.

5. The liquid crystal display device of claim 1, wherein in the second and third regions, the respective areas of the liquid crystal domains of the first, second, third and fourth types are equal to each other.

6. The liquid crystal display device of claim 1, wherein the first region has a first luminance and the luminances of the second and third regions are substantially equal to other and represented as a second luminance, and wherein when the pixel region displays a certain grayscale level, the first and second luminances are different from each other, and the certain grayscale level corresponds to a luminance between the first and second luminances.

7. The liquid crystal display device of claim 6, wherein when the pixel region displays a certain grayscale level, the first luminance is higher than the second luminance.

8. The liquid crystal display device of claim 7, wherein in the pixel region, the combined area of the second and third regions is approximately three times as large as the area of the first region.

9. The liquid crystal display device of claim 6, wherein when the pixel region displays a certain grayscale level, each of the liquid crystal domains of the first, second, third and fourth types that the first, second and third regions have produces a dark area, which looks darker than the region with the first or second luminance that includes the liquid crystal domain for a viewer located in front of the device, inside of, and substantially parallel to, an edge portion of the first, second or third subpixel electrode, and wherein the first substrate includes a shielding member, which includes a shielding portion for selectively shielding at least a part of the dark area from incoming light.

10. The liquid crystal display device of claim 6, wherein in the first region, the liquid crystal domain of the first type is located close to at least a part of an edge of the first subpixel electrode, the part including a first edge portion in which an azimuthal direction that is perpendicular to the part and that points toward the inside of the first subpixel electrode defines an angle greater than 90 degrees with respect to the first direction, the liquid crystal domain of the second type is located close to at least a part of another edge of the first subpixel electrode, the part including a second edge portion in which an azimuthal direction that is perpendicular to the part and that points toward the inside of the first subpixel electrode defines an angle greater than 90 degrees with respect to the second direction, the liquid crystal domain of the third type is located close to at least a part of another edge of the first subpixel electrode, the part including a third edge portion in which an azimuthal direction that is perpendicular to the part and that points toward the inside of the first electrode defines an angle greater than 90 degrees with respect to the third direction, the liquid crystal domain of the fourth type is located close to at least a part of another edge of the first subpixel electrode, the part including a fourth edge portion in which an azimuthal direction that is perpendicular to the part and that points toward the inside of the first subpixel electrode defines an angle greater than 90 degrees with respect to the fourth direction, and wherein the shielding member includes at least one of first, second, third and fourth shielding portions for selectively shielding at least a part of the first, second, third or fourth edge portion from incoming light.

11. The liquid crystal display device of claim 6, wherein in the second and third regions, the liquid crystal domain of the first type is located close to at least a part of an edge of the second or third subpixel electrode, the part including a first edge portion in which an azimuthal direction that is perpendicular to the part and that points toward the inside of the second or third subpixel electrode defines an angle greater than 90 degrees with respect to the first direction, the liquid crystal domain of the second type is located close to at least a part of another edge of the second or third subpixel electrode, the part including a second edge portion in which an azimuthal direction that is perpendicular to the part and that points toward the inside of the second or third subpixel electrode defines an angle greater than 90 degrees with respect to the second direction, the liquid crystal domain of the third type is located close to at least a part of another edge of the second or third subpixel electrode, the part including a third edge portion in which an azimuthal direction that is perpendicular to the part and that points toward the inside of the second or third electrode defines an angle greater than 90 degrees with respect to the third direction, the liquid crystal domain of the fourth type is located close to at least a part of another edge of the second or third subpixel electrode, the part including a fourth edge portion in which an azimuthal direction that is perpendicular to the part and that points toward the inside of the second or third subpixel electrode defines an angle greater than 90 degrees with respect to the fourth direction, and wherein the shielding member includes at least one of first, second, third and fourth shielding portions for selectively shielding at least a part of the first, second, third or fourth edge portion from incoming light.

* * * * *